United States Patent
Galai et al.

(10) Patent No.: US 10,785,332 B2
(45) Date of Patent: *Sep. 22, 2020

(54) USER LIFETIME REVENUE ALLOCATION ASSOCIATED WITH PROVISIONED CONTENT RECOMMENDATIONS

(71) Applicant: Outbrain Inc., New York, NY (US)

(72) Inventors: Yaron Galai, New York, NY (US); Ido Tamir, Hod Hasharon (IL); Roy Bass, Herzliya (IL); Colin Doody, New York, NY (US); Yaniv Gilad, New York, NY (US); Daniel Sternlicht, Netanya (IL); Ronny Lempel, Zichron Yaakov (IL); Sagiv Gurevitch, Tenafly, NJ (US); Carmel Bregman, Ramat Gan (IL); Danny Rosenstein, Hod Hasharon (IL); Sonya Liberman, Jerusalem (IL); Elad Bar, Kadima (IL); Ilan Orlov, Givatayim (IL)

(73) Assignee: Outbrain Inc., New York, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/169,562

(22) Filed: Oct. 24, 2018

(65) Prior Publication Data

US 2019/0058770 A1 Feb. 21, 2019

Related U.S. Application Data

(63) Continuation-in-part of application No. 14/657,457, filed on Mar. 13, 2015, now Pat. No. 10,165,069.

(60) Provisional application No. 61/954,928, filed on Mar. 18, 2014.

(51) Int. Cl.
| | |
|---|---|
| G06F 15/173 | (2006.01) |
| H04L 29/08 | (2006.01) |
| H04N 21/466 | (2011.01) |
| H04N 21/475 | (2011.01) |
| H04N 21/482 | (2011.01) |

(52) U.S. Cl.
CPC .............. H04L 67/22 (2013.01); H04L 67/02 (2013.01); H04N 21/466 (2013.01); H04N 21/4756 (2013.01); H04N 21/4826 (2013.01)

(58) Field of Classification Search
None
See application file for complete search history.

(56) References Cited

U.S. PATENT DOCUMENTS 7,113,917 B2 * 9/2006 Jacobi ................ G06Q 30/0253
 705/14.53
9,565,078 B1 * 2/2017 Smith ................. H04L 43/0817
(Continued)

Primary Examiner — Mohamed Ibrahim
(74) Attorney, Agent, or Firm — Lowenstein Sandler LLP

(57) ABSTRACT

A personalized content recommendation provisioning method and system are described, according to various implementations. A token value allocation engine optimizes the allocation of content consumption revenue to publisher systems and recommendation source systems (e.g., the systems that provide the recommended content for presentation with the publisher system's native content) based on a model calculating and applying a life time or long term value (LTV) metric. The LTV metric for revenue is based on a detection of a how often a user system engages with content derived from or associated with a publisher system.

19 Claims, 17 Drawing Sheets

(56) References Cited

U.S. PATENT DOCUMENTS

| | | | |
|---|---|---|---|
| 2008/0005313 A1* | 1/2008 | Flake | G06Q 30/02 709/224 |
| 2009/0171986 A1* | 7/2009 | Chitrapura | G06F 16/951 |
| 2016/0188725 A1* | 6/2016 | Wang | G06F 16/9535 707/734 |

* cited by examiner

USER LIFETIME REVENUE ALLOCATION ASSOCIATED WITH PROVISIONED CONTENT RECOMMENDATIONS

CROSS-REFERENCE TO RELATED APPLICATIONS

This application is a continuation-in-part of U.S. patent application Ser. No. 14/657,457, filed Mar. 13, 2015, which claims the benefit of U.S. Provisional Application No. 61/954,928, filed on Mar. 18, 2014. U.S. patent application Ser. No. 14/657,457 and U.S. Provisional Application No. 61/954,928 are hereby incorporated by reference herein in their entireties.

TECHNICAL FIELD

The present disclosure relates to content recommendation networks, and more particularly, to provisioning of content recommendations to users in an electronic environment.

BACKGROUND

In the electronic content publishing industry, it is desirable for a content publisher (e.g., a website provider) to present users not only with content in an initial form (e.g., a webpage), but also provide users of that content with additional "recommended" content. In this regard, it should be a goal of the content publisher to provision personalized content recommendations that are simultaneously interesting, trustworthy, novel and relevant to the user. This will have the effect of increasing the user's consumption of the recommended content, achieving a higher level of user engagement while increasing the content publisher's revenue.

BRIEF DESCRIPTION OF THE FIGURES

The present disclosure will be understood more fully from the detailed description given below and from the accompanying drawings of various implementations of the disclosure.

FIG. 5 is an exemplary screenshot of a content recommendation widget (pre-registration), in accordance with various implementations.

DETAILED DESCRIPTION

A personalized content recommendation provisioning method and system are described, according to various implementations. In an implementation, a user profile is established for each of multiple users within an electronic data environment (e.g., the Internet). The user profile may include information identifying content consumed by the user based at least in part on information collected by an associated tracking cookie (also referred to as the "user activity"). The multiple user profiles and corresponding user activity may be used to map and store aggregated data relating to user content consumption activities, engagement, interests and preferences across multiple content networks.

In an implementation, multiple sets of high-quality content recommendation candidates are identified. The sets, also referred to as "candidate content recommendation pools" may be associated with a measurement of user trust (also referred to as a "long-term user trust measure") or user interests. In an implementation, the system may include a module (herein the "content recommendation personalization module") configured to analyze the user profile and one or more content recommendation scopes or user interests to identify or generate one or more personalized content recommendations from the content recommendation candidate pools for each user across multiple content serving locations and content usage profiles. The content recommendation personalization module may be a software component (e.g., a set of instructions residing in a memory) executable by one or more processing devices to perform the personalized content recommendation generating activities described herein (e.g., the methods described in detail in connection with FIGS. 3-4).

Figure 1:
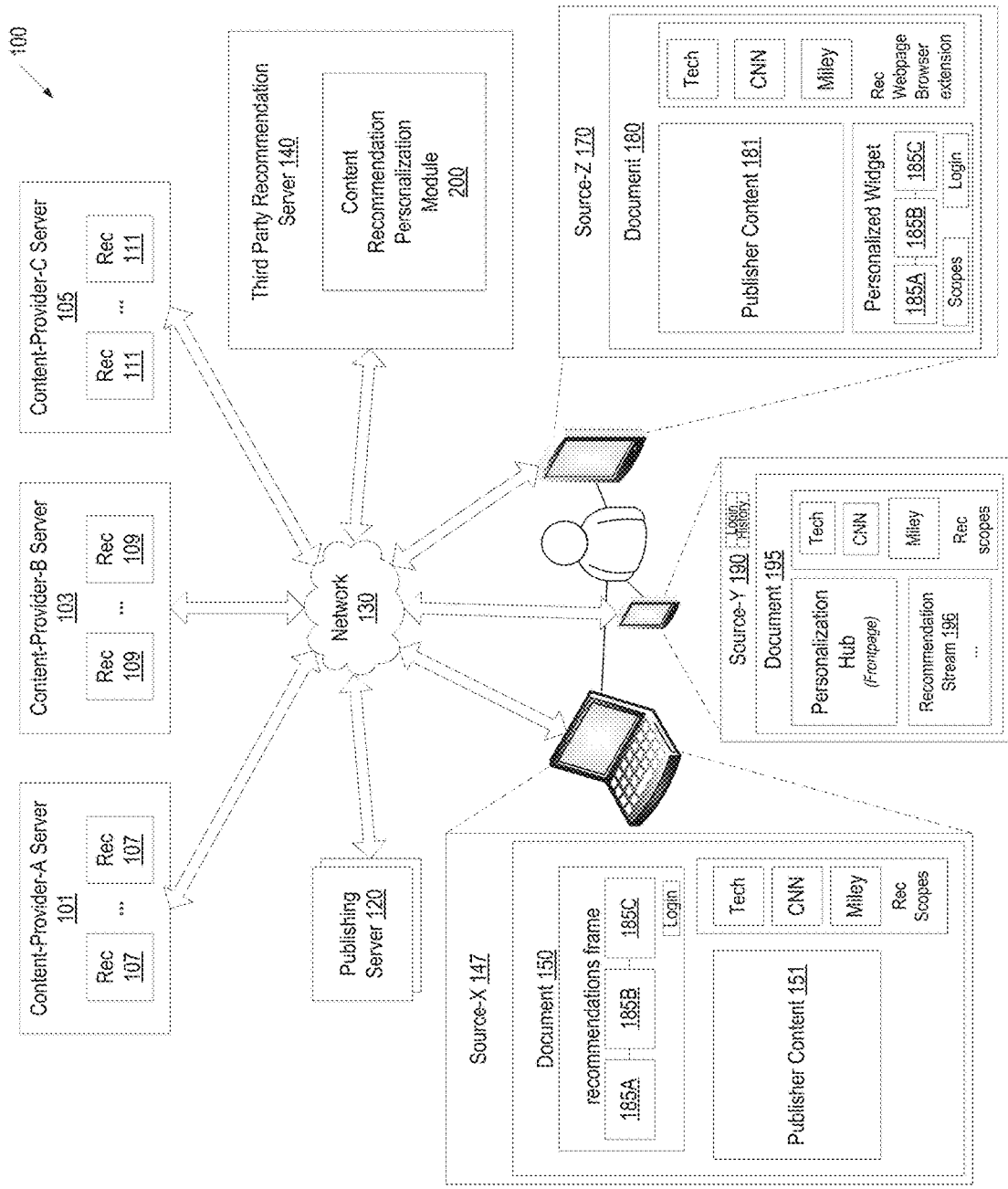
FIG. 1 illustrates an example system architecture in which examples of the present disclosure can be implemented.

FIG. 1 illustrates an example system architecture 100 in which examples of the present disclosure can be implemented. The system architecture 100 can include one or more target user devices 160A, 160B, 160C, one or more content provider servers 101, 103, 105, one or more destination servers (e.g., publishing servers 120) and one or more third party recommendation servers 140 coupled to each other over one or more networks 130.

Content providers (e.g., publishers, advertisers, marketers) may have content recommendations (e.g., content recommendations 107, 109, 111) they wish to have displayed, for example, in a publisher document (e.g., document 150, 180). A document 150, 180, 195 may be for example, and is not limited to a website homepage, section front, webpage, mobile application user interface (UI), gaming application UI, television application UI, etc. For example, a content provider 101, 103, 105 may have multiple candidate content recommendations 107, 109, 111 that the content provider makes available for provisioning to a target user via a document 150, 180, 195 (e.g., SportsNews webpage, a BaseballNews webpage) of a source (e.g., Source-X 147, Source-Y 190, Source-Z 170). A candidate content recommendation 107, 109, 111 can be a representation of digital or electronic content. Digital content can include, for example, such as, and not limited to, an article, a web blog entry, a social media posting, a data feed, an advertisement, a document (e.g., webpage), paid or sponsored editorial content, digital video, digital movies, digital photos, digital music, social media updates, electronic books (ebooks), electronic magazines, digital newspapers, digital audio books, electronic journals, electronic comic books, software applications, haptic interfaces, Internet Of Things (IOT) interaction surfaces and devices, virtual or augmented reality environments etc. Each content provider can have multiple candidate content recommendations 107, 109, 111 considered by a content recommendation personalization module 145 of a third party recommendation server 140 as a candidate for provisioning to one or more target users.

A content recommendation host or "publisher" hereinafter refers to an entity and platform hosting destination documents (e.g., webpages, mobile application graphical user interfaces (GUIs), gaming application GUIs, television application GUIs, mobile smartphone lock screen apps etc.) that include content recommendations 107, 109, 111 of the content providers 101, 103, 105. For example, SportsNews, Inc. and BaseballNews, Inc. may be publishers. The publisher platforms can include publishing servers 120. The publisher servers 120 can be application servers that provide one or more applications (e.g., web application, mobile application, desktop application, gaming console applications, television console application, virtual or augmented reality application etc.). The publishing servers 120 can be coupled to one or more data stores that store publisher data and/or content recommendations of content providers.

According to implementations, the publishers' destination documents 150, 180, 195 can be rendered with the content recommendations 107, 109, 111 of the content providers in user devices using for example, an application (e.g., web browser, mobile application, desktop application, gaming application, television application, virtual or augmented reality application etc.) on the user device.

A document 150, 180 can be within a source 147, 170. The source 147, 170 may include, but is not limited to, a publisher's website, a publisher's mobile application, publisher's gaming application, publisher's television application, etc. A destination document 150, 180 can include publisher content (e.g., publisher content 151, 181). For example, the SportsNews website (e.g., source 147) can include a webpage (e.g., document 150) that contains an article about a baseball game (e.g., publisher content 151).

The content providers may wish to publish their respective content recommendations 107,109,111 in widespread locations across multiple networks (e.g., document 150, document 180, document 195) in a variety of different ways. In an implementation, the source may maintain a content recommendation frame (e.g., Source-X 147) including one or more content recommendation opportunities 185A, 185B, 185C). In an implementation, the source may maintain a content recommendation frame (e.g., Source-Z 170) including a personalized widget having one or more content recommendation opportunities 185A, 185B, 185C). In an implementation, the source may include a personalization hub (or frontpage) having an associated content recommendation stream 196 for presenting one or more content recommendations to a user.

The content providers can use the service hosted by the third party content recommendation service provider to have the content recommendations 107, 109, 111 of the content providers served to populate the content recommendation opportunities in the publisher documents 150, 180, 195. The publishers (e.g., SportsNews Inc., BaseballNews, Inc.) can use the service hosted by the third party content recommendation service provider to receive content recommendations 107, 109, 111 to populate the content recommendation opportunities 185A, 185B, 185C, 196 in their respective publisher documents 150, 180, 195.

The third party content recommendation service provider can host one or more third party content recommendation servers 140 to provide the service to the content providers and publishers. The servers 140 include the content recommendation personalization module 145 configured to generate one or more personalized content recommendations for provisioning for a target user via a source 147, 170, 190. The content recommendation personalization module 145 is a software component (e.g., a set of instructions residing in a memory) executable by one or more processing devices to perform the personalized content recommendation generating activities described herein (e.g., the methods described in detail in connection with FIGS. 3-4). The instructions of the content recommendation personalization module 145 may reside in a memory including any suitable computer readable storage medium, such as volatile memory devices (e.g., random access memory (RAM), non-volatile memory devices (e.g., flash memory), a magnetic hard disk, a Universal Serial Bus (USB) solid state drive, a local disk, an external disk, and/or other types of memory devices).

The network of content providers can include, for example, several hundred thousand candidate content recommendations 107,109,111 that may be stored in one or more data stores that are coupled to the network 130. The architecture 100 can include, for example, several hundred publisher documents 150,180, 195 that are accessed by multiple users on various user devices.

For example, document 150 may have three content recommendation opportunities 185A, 185B, 185C for provisioning a personalized content recommendation for the target user. When the target user accesses the particular document 150, the content recommendation personalization module 145 can generate a set of personalized content recommendations to populate the content recommendation opportunities in document 150. As each target user accesses a document 150,180, 195, the content recommendation personalization module 145 can determine one or more personalized content recommendations associated with the particular target user, in accordance with the methodologies described in detail below.

The network 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160A-B-C are directly connected to each other. The networks 130 may be separate networks.

The servers 101,103,105,120,140 can be hosted on one or more machines. The machines can include for example, and are not limited to, any data processing device, such as a desktop computer, a laptop computer, a mainframe computer, a personal digital assistant, a server computer, a handheld device, a wearable computer or any other device configured to process data.

A user device can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader, wearable electronic devices and the like. For example, a user device may be a laptop computer, a tablet computer, a smartphone or a smartwatch.

According to embodiments of the present disclosure, the source may be implemented as a web page (e.g., a content recommendation personalization hub or frontpage) accessible by a user (e.g., Source-Y 190) and/or a web application (e.g., a content recommendation widget as shown in Source-Z 170, a web frame (e.g., the content recommendations frame of Source-X 147), a web browser extension, a mobile app, etc.) for allowing users to access, read and customize personalized content recommendations.

Figure 13:
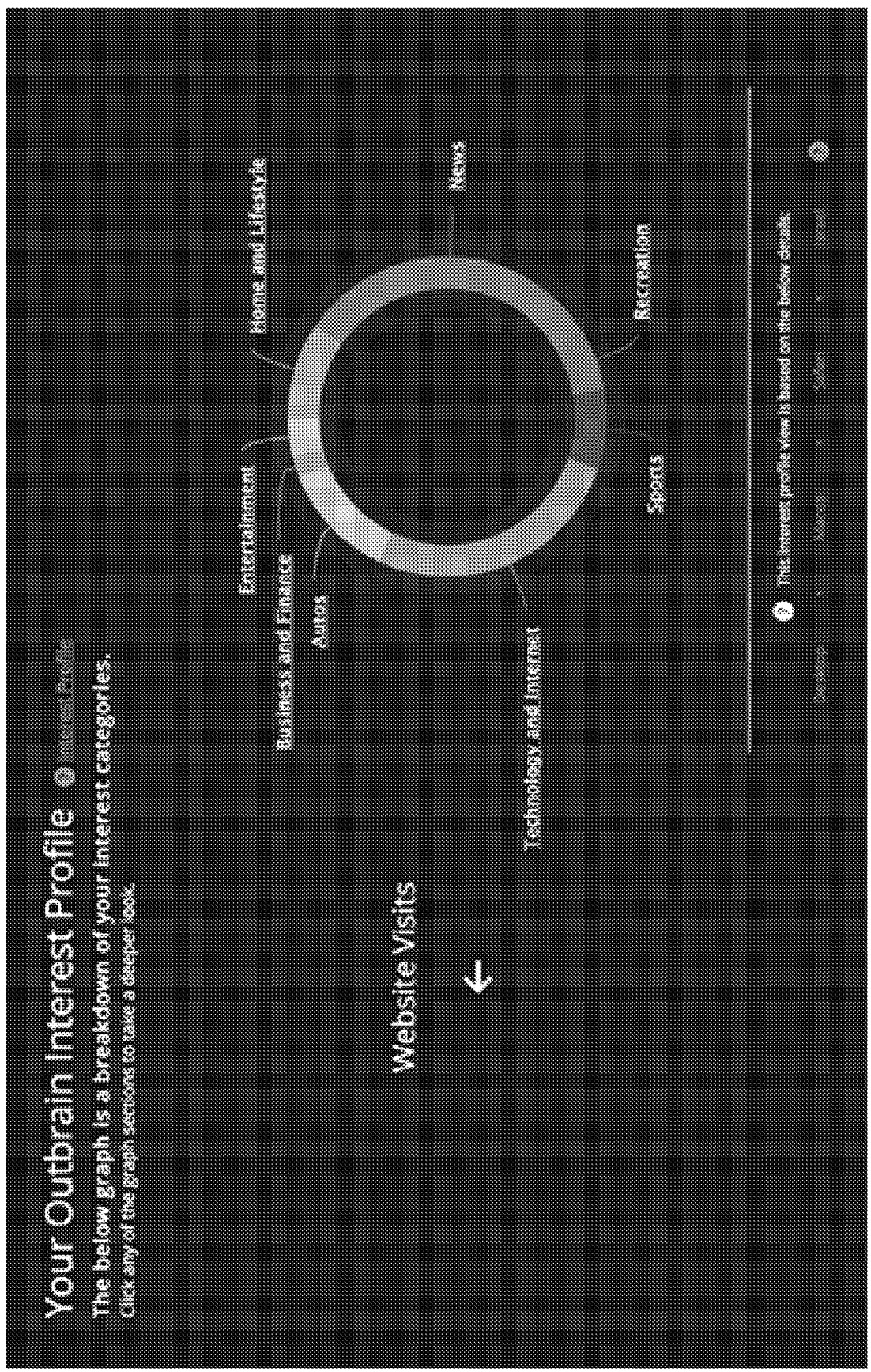
FIG. 13 is an exemplary screenshot of a user content taste profile graph, in accordance with various implementations.

In an embodiment of the present disclosure, the user profile (or user content identity profile) and an associated tracking cookie are used to track, map and store user data relating to a user's electronic or web-based content consumption across the web and multiple devices associated with the user. The user cookie tracks the user's implicit usage (e.g., documents actually read by the user) and provides data about the user's explicit choices (e.g., a user's choice of one or more content recommendation scopes). In an implementation, the user cookie may also be used to store the user's profile, including data about content the user has read and liked. In an implementation, some of the user cookie data associated with the user's unique profile may be stored on a secure third party content recommendation server. In an implementation the user's tracked content consumption data can be mapped and stored as a user taste profile graph indicating the relative percentage of content types consumed by the user, as shown in FIG. 13.

In an implementation, to ensure the user's privacy, the cookie may not include any personally identifying information. A UUID (universally unique identifier) number is generated and assigned to the user tracking cookie and is subsequently reused (rewritten to the user's cookie) by the user content identity profile upon user registration.

In an implementation, the user may register with the system. Registering with the system provides the user with a consistent reading experience across multiple devices, browsers, geographical locations, and times of day. For example, duplicate content recommendations to the same user may be avoided if a user is registered and/or logged in to the system. In an implementation, registration also enables the user to be notified about and sign up for additional content recommendation services. In another embodiment the user profile data can be stored on and accessed from a secure third party content recommendation server. In another embodiment the user can login to the personalized hub homepage using a third-party user identity (e.g., a facebook.com or twitter.com user login).

As shown in FIG. 1, the source may present one or more content recommendation scopes to a user. A content recommendation scope is a grouping of content used to organize and/or constrain the served content recommendation entities based on one or more content characteristics (e.g., a source of the content, a category associated with the content, a topic of the content, an author of the content, an algorithm type, etc.). In implementations, each content recommendation scope is associated with one or scoped content recommendations identified in accordance with the aspects of the present disclosure.

Figure 2:
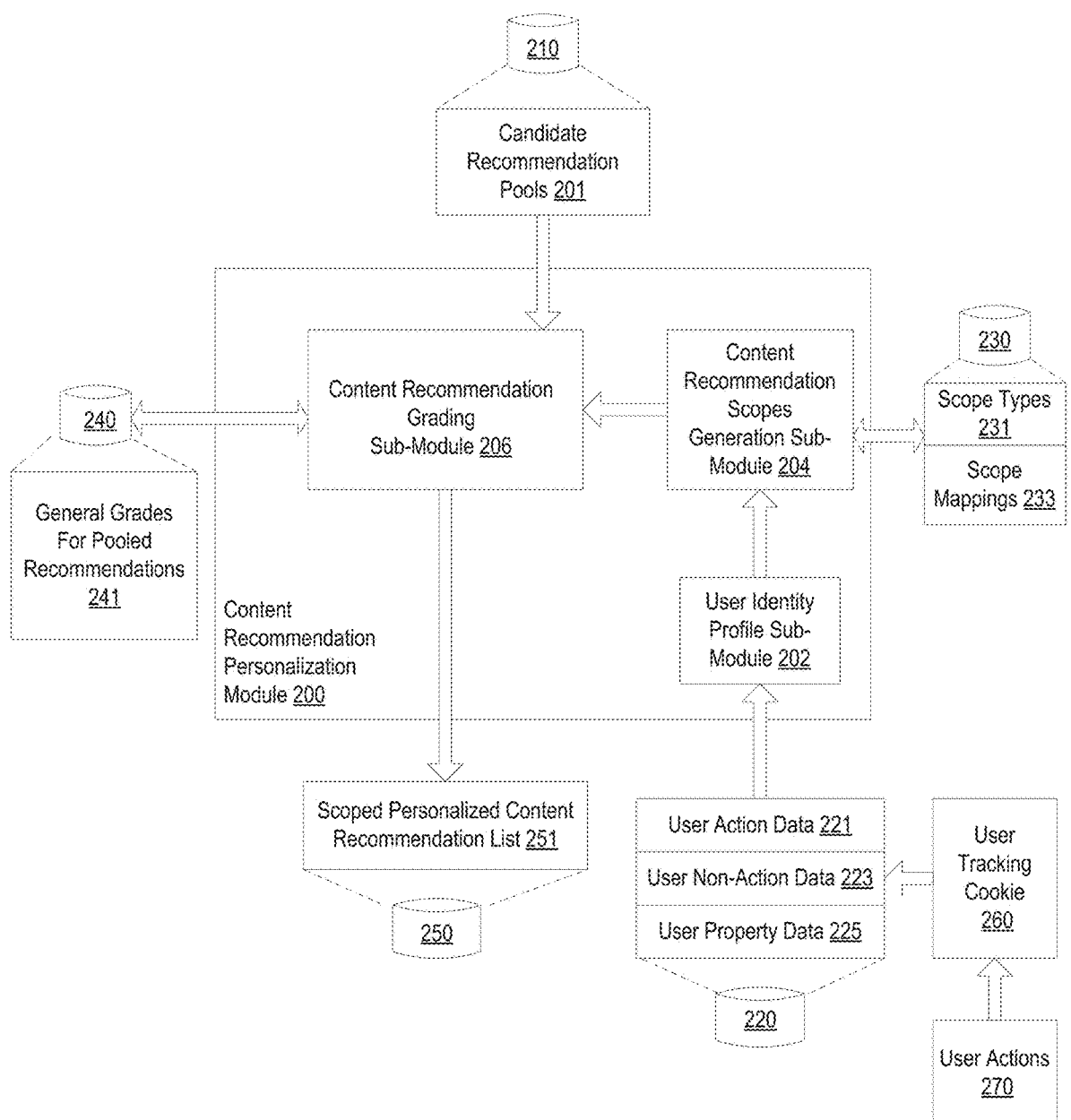
FIG. 2 is a block diagram of a content recommendation personalization module, in accordance with various implementations.

FIG. 2 is a block diagram of a content recommendation personalization module 200 (e.g., content recommendation personalization module 145 of FIG. 1), in accordance with various implementations of the present disclosure. The content recommendation personalization module 200 can include a user identify profile sub-module 202, a content recommendation scopes generation sub-module 204, and a content recommendation grading sub-module 206. Note that in alternative implementations, the functionality of one or more of the user identify profile sub-module 202, the content recommendation scopes generation sub-module 204, and the content recommendation grading sub-module 206 may be combined or divided. Note that in alternative implementations, the functionality of the content recommendation personalization module 200 can be separate modules.

The content recommendation personalization module 200 can be coupled to one or more data stores 210, 220, 230, 240, 250 that store data. The data stores 210, 220, 230, 240, 250 can be persistent storage units. A persistent storage unit can be a local storage unit or a remote storage unit. Persistent storage units can be a magnetic storage unit, optical storage unit, solid-state storage unit, electronic storage unit (main memory), or a similar storage unit. Persistent storage units can be a monolithic device or a distributed set of devices. A 'set', as used herein, refers to any positive whole number of items.

The data stores 210, 220, 230, 240, 250 can store input and/or output data. The modules (e.g., the user data collection sub-module 202, the cluster generation sub-module 204, and the content recommendation grading sub-module 206) can be coupled to the one or more data stores 210, 220, 230, 240, 250 and can read from and write to the one or more data stores 210, 220, 230, 240, 250.

Data store 210 can store candidate content recommendation pools 201 identified by the content recommendation personalization module 200. The candidate content recommendation pools 201 may be considered by the content recommendation personalization module 200 in formulating the personalized content recommendations for the one or more target users. In an implementation, a candidate content recommendation pool 201 may be a representation of digital or electronic content. According to implementations of the present disclosure, the candidate content recommendation(s) in the content recommendation pools can include, for example, and is not limited to, one or more text, links, thumbnails, images, icons, etc.

According to implementations of the present disclosure, data store 220 is configured to store user data collected by the user identity profile sub-module 202. The user data may include user action data 221, user non-action data 223 and user property data 225. The user data may be collected for any quantity of users via any suitable methodology. For example, user-specific data from multiple users may be collected by the user identity profile sub-module 202 by storing a user identifier (e.g., a cookie stored on the user's browser) and/or using a user login (e.g., wherein a user is associated with login credentials which enable the collection of user data for that user across multiple devices, browsers and networks). In an implementation, user data might be collected and anonymized to comply with any governing privacy regulations (e.g. GDPR).

According to implementations of the present disclosure, user action data 221 may include any data associated with a user's electronic actions or activity including, but not limited to, page visits, clicks on a widget or application, scrolling of webpage sections, pointing device (e.g., mouse or keyboard) movements, clicks or other indications, haptic input, a time of activity on a webpage and/or web site, a listing of web sites visited by a user, languages a user reads, special interest indicators such as "like" indications or "dislike" indications, user explicit data such as categories, etc.

According to implementations, user non-action data 223 includes passively generated data including, but not limited to, social data associated with a user from a social network, viewing a content link (e.g., a content recommendation) but not interacting with the link, other personal data associated with the user, etc.

According to implementations, user property data 225 includes properties associated with a user including, but not limited to, a geographic location of a user, document properties associated with documents viewed by a user (e.g., document categories, document size, estimated document reading time), content type or format (e.g., video, slideshows, audio, articles, games, etc.), etc. The user property data 225 collected by the content recommendation module 200 may further include registration information, personal information, and/or demographic information pertaining to users and/or groups of users (e.g., age of user groups, geographic location of user groups) and may store the information in one or more data stores (e.g., hard disks, memories, databases, etc. like data store 220). In situations in which the implementations discussed herein collect personal information and/or demographic about users, or may make use of personal information and/or demographic information, the user may be provided with an opportunity to control whether the content recommendation module 200 is allowed to collect the information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the content recommendation module 200.

In an implementation, user actions 270 are tracked using a user tracking cookie 260 in order to identify user action data 221, user non-action data 223, and/or user property data 225.

According to implementations of the present disclosure, the content recommendation scopes generation sub-module 204 is configured to generate one or more content recommendation scopes (e.g., a collection of one or more scoped content recommendations). According to implementations, the content recommendation scopes generation sub-module 204 may generate any suitable quantity of content recommendation scopes, as described below in detail with regard to FIG. 3.

According to implementations of the present disclosure, the content recommendation grading sub-module 206 is configured to grade one or more content recommendation pools. In an implementation, the content recommendation grading sub-module 206 may generate a general grade for the pooled content recommendations and a user-specific or personalized grade for a particular user based on the user identity data associated with the particular user as constrained by one or more content recommendation scopes for a user, as described in greater detail in connection with FIGS. 3 and 4. In an implementation, based on the grades assigned to the multiple candidate content recommendations, the content recommendation grading sub-module identifies one or more scoped content recommendations or scoped personalized content recommendations 251 that may be presented to a user (e.g., as a list).

Figure 3:
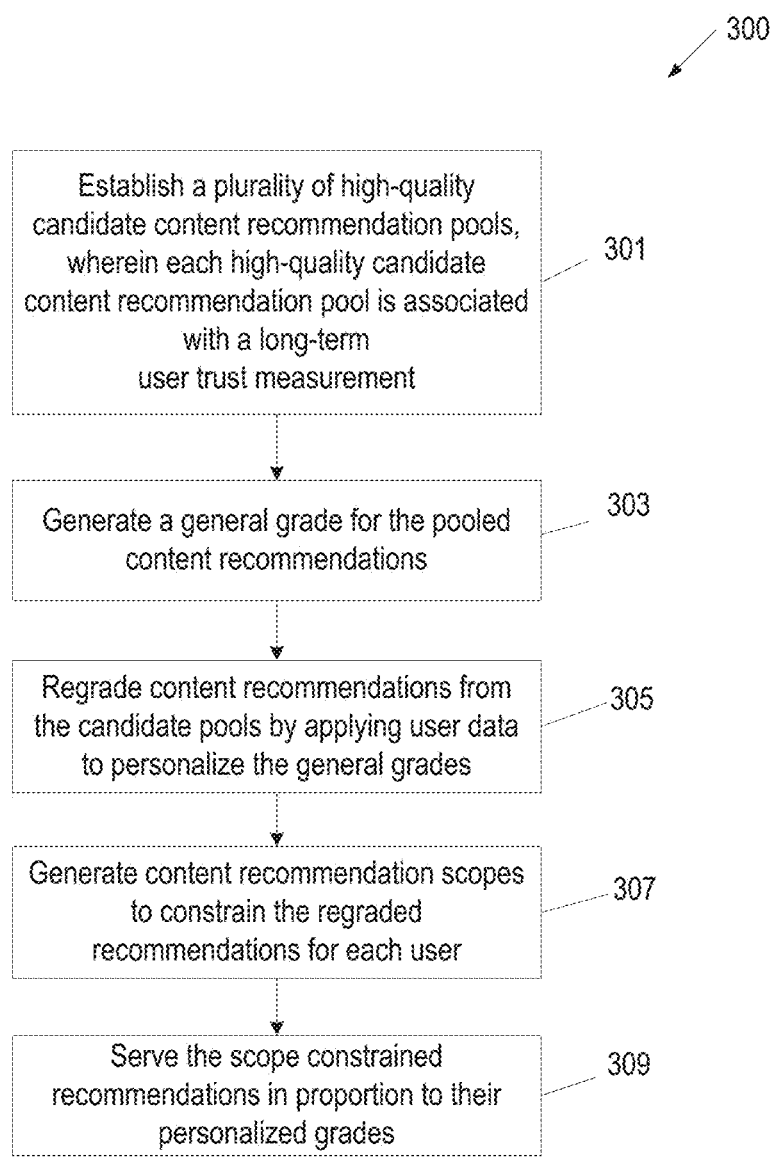
FIG. 3 is a flow diagram of an implementation of a method for serving personalized content recommendations, in accordance with various implementations.

FIG. 3 is a flow diagram of an exemplary implementation of a method 300 for analyzing user content identity profiles and their associated content recommendation scopes to generate personalized content recommendations from the content recommendation candidate pools for each user across multiple content serving locations and content usage scenarios. The method 300 may be performed by processing logic that may comprise hardware (circuitry, dedicated logic, etc.), software (such as is run on a general purpose computer system or a dedicated machine), or a combination of both. In an implementation, the method 300 may be performed by the content recommendation personalization module 145 hosted in a server 140 of FIG. 1 or by the content recommendation personalization module 200 illustrated in FIG. 2.

According to an implementation, method 300 includes creating and/or identifying personalized content recommendations by building multiple pools of high-quality content recommendation candidates (e.g., candidate content recommendations may be considered "high-quality" based on a measure of a previously determined click-through-rate (CTR) and the features they best represent), in block 301. The "best" or optimized content recommendations in the content network are aggregated into a plurality of sets of content recommendation candidate pools, each pool being distinguished or classified based on a "user trust measurement" or a "user trust measures" or a "long-term user trust measurement", such as, for example, a user engagement measure, a user interest relevance grade, a high content recommendation quality metric, or based on a document property (e.g., the type or category of the document).

In an implementation, qualitative user trust or interest measures may be determined based on one or more user trust or interest signals identified at one or more of the following levels: a user level (e.g., based on the user profile, user action or activity history, an associated user cluster, etc.); a document level (e.g., a trustworthiness or interestingness associated with the document, whether the document is considered evergreen content, etc.); and a source or context level (e.g., which section of a website the document appears in, a category associated with publisher source, a publisher, a language, a time of day, a day of the week, etc.).

In an implementation, the user trust measures may include, but are not limited to, one or more of the following: on-page user behavior events like scrolling and duration; average duration of user sessions on a content publisher's website; the number of documents/articles the user has viewed per session; the number of comments on an article;

the percentage of article comments read by users; the number of return visits by the user to the content publisher's website over time in association with clicks by the user on the content recommendations provided on the content publisher's website; an indicator of content sharing by the user (e.g., copying the document's/article's URL by the user or clicking on the article's "share" button); a measure of the CTR associated with a document; the number of reads to end of article; an "evergreen" content recommendation associated with each document category; a best CTR by location; the number of document content recommendations or "likes" by other users, etc.

In an implementation, the system creates sets of pools of high-quality content recommendation candidates, each pool being associated with a long-term user trust or interest measurement. From the list of these sets of content recommendation candidate pools the system may match and choose suitable content recommendation candidates for each user profile. Advantageously, a scalable platform is provided for experimentation with different content recommendation candidate pools in order to increase long-term user trust and engagement. The network-wide dispersal of the resulting content recommendation impressions affords valuable feedback and data on the quality of the content recommendations that can be used by the content recommendation service provider to further enrich and optimize the candidate content recommendation pools.

In one implementation, from a network-wide "whitelist" of content sources (i.e., content cleared by publishers for sharing on the content recommendation network), multiple types of high-quality candidate content recommendation pool sets may be generated. Such candidate content recommendation pool sets can include user trust and user interest signals or attributes that can be used to identify and cluster documents into the pool sets. Exemplary user trust and user interest signals or attributes may include: one or more "evergreen" content recommendations worldwide in English having a highest relative user engagement measure (e.g., click through rate (CTR), maintaining user interest over a long time period); content recommendations with the highest relative CTR for a particular geographic location and language; content recommendations with the highest relative CTR for a category and language; content recommendations with the highest relative CTR or revenue per thousand impressions (RPM) in a user cluster; content recommendations that have been allocated differing user trust thresholds for different classifications of users (e.g., classification of users by interests); and trending topics for a specific geographic location.

In an implementation, grades in each pool are normalized between sources. For example, a set of content recommendations may be generated, each with a prior grade and the set of "features" it was selected for (geography, category, source, etc.). Each document may also be tagged with a plurality of content recommendation pool metadata tags that can be used by the system to quickly generate new combinations and categories of content recommendation pools, if necessary.

In block 303, according to an implementation, a general grade may be generated for the set of all possible content recommendations in the pool based on one or more of a prior grade associated with the particular content recommendation and a user engagement measurement (e.g., CTR). In an embodiment, a prior grade is generated for the content recommendation. In an implementation, one or more content recommendations may be preselected based on previous performance in the network. In an implementation, a content recommendation's prior grade may represent an estimate of how well a content recommendation may perform in the future.

In an implementation, the general grade is based on an online-CTR for a particular content recommendation derived from aggregated user data associated with the network. In an embodiment, the current grade for a content recommendation is a combination of the prior grade and the actual CTR. The general grades may be personalized by assigning weights to the content recommendation pools in proportion to the user profile interest data that matches those pools. For example, if a user consistently chooses "evergreen" content over CTR driven content, the user may be associated with an "evergreen" content recommendation pools as a source of potential content recommendation candidates.

In block 305, according to implementations of the present disclosure, personal information associated with a particular user (e.g., one or more personal weights/constraints) may be considered in order to generate a personalized grade for a particular user. In implementations, the personalized grade may be an update, change, adjustment, re-calculation of the general grade in view of the personal information associated with the particular user. In an implementation, an actual CTR may be calculated for each content recommendation in the source. The actual CTR may then be combined with a prior grade associated with the content recommendation. In an embodiment, the user profile may be identified based on the cookie information and the user registration information. The grade for a content recommendation may then be re-graded or re-calculated in view of the user profile information.

In block 307, in an implementation, one or more content recommendation scopes may be generated to constrain the re-graded content recommendations for each user, in block 307. According to implementations of the present disclosure, a content recommendation scope is a content recommendation filter that presents the user with content recommendations conforming to the user's chosen scopes (also referred to as "scoped content recommendations"). In an implementation, the content recommendations may be filtered by one or more content recommendation scope parameters, such as, for example, by features the content recommendation was selected by (e.g., categories the user saw, user geographic location, scope preferences explicitly chosen or dismissed by the user, etc.).

In an implementation, a content recommendation may be filtered by its properties (e.g., categories, the content recommendation pool it came from, sources), the user properties (e.g., categories, geographic location, sources) and/or the current content recommendation scope the user is located within (e.g., information associated with a current web site or document that the user is consuming). In an implementation, a "relevance-to-user" measure associated with a particular content recommendation may be assigned on a per user basis to multiple users, for example, based on the best CTR in a user cluster from its profile. In an embodiment, a personalized grade generated in block 305 may be represented by the following expression:

$$personal\_grade = relevance\_to\_user * general\_grade$$

In block 309, according to an implementation of the present disclosure, content recommendations are then served to users in proportion to their personalized grades, as filtered by the user's content recommendation scopes in block 307 (as described below in detail with reference to FIG. 4).

Figure 4:
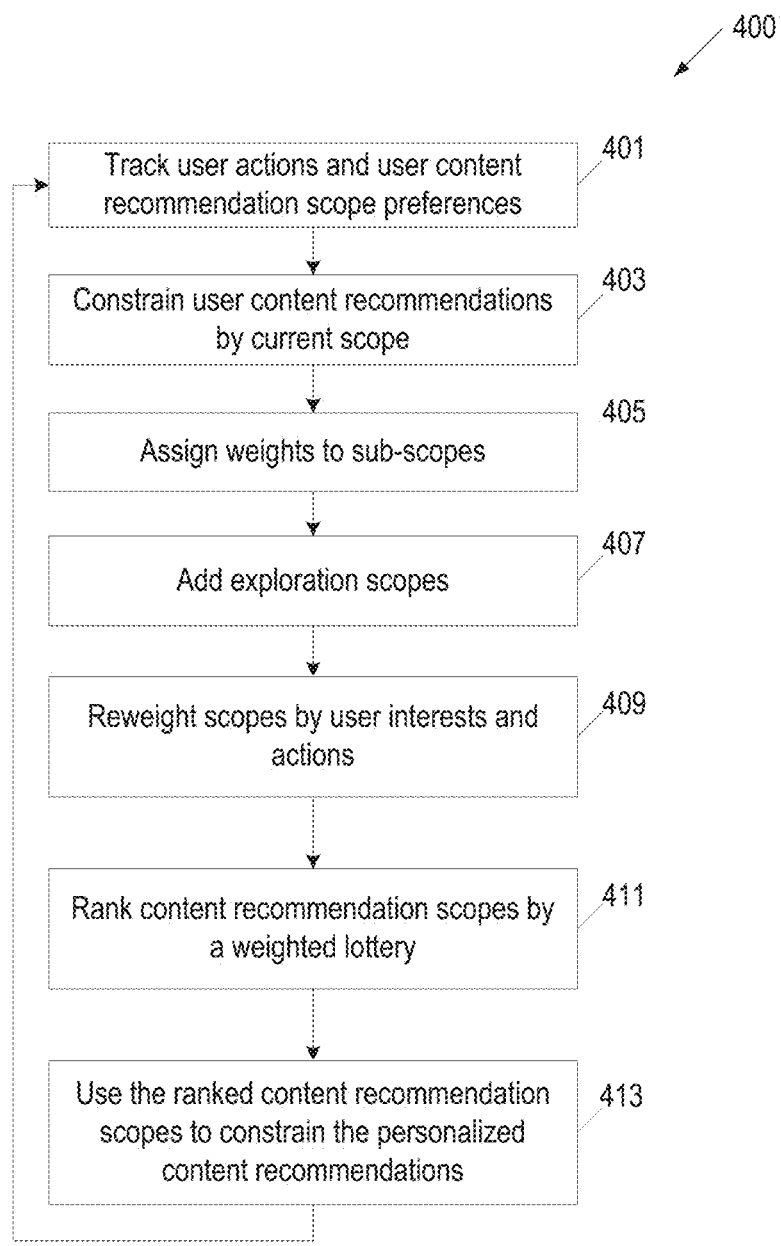
FIG. 4 is a flow diagram of an implementation of a method for generating content recommendation scopes for users, in accordance with various implementations.

FIG. 4 is a flow diagram of an exemplary implementation of a method 400 for using ranked content recommendation scopes to constrain personalized content recommendations, according to implementations of block 307 of FIG. 3. The method 400 may be performed by processing logic that may comprise hardware (circuitry, dedicated logic, etc.), software (such as is run on a general purpose computer system or a dedicated machine), or a combination of both. In an implementation, the method 400 may be performed by the content recommendation personalization module 145 hosted in a server 140 of FIG. 1 or by the content recommendation personalization module 200 illustrated in FIG. 2.

In an implementation, content recommendation scopes comprise a content taxonomy optimized to organize and constrain the served content recommendation entities (e.g., by source, category, topic, author, algorithm type etc.). This results in a themed stream of content being provided for personalized browsing by the user. In block 401, user data associated with a user's action (e.g., a user's click on a scope implies actual interest in reading more content from that content recommendation scope) is tracked and analyzed to identify current and potential user recommendation scope preferences.

In an implementation, users can employ explicit choices to configure the content recommendation scopes they prefer. The user can also delete or negate unwanted scopes, which will not be served to the user from then on. All such user preference data, including user scope preferences, are stored in the user content identity profile and accessed by the content recommendation system whenever necessary, in block 401.

In an implementation, personalized content recommendations of scopes are generated by matching the user content profile (and its associated user tracking cookie) to content recommendation scopes that might interest the user. The selected personalized content recommendations are constrained based on a listing of ranked content recommendation scopes (wherein the ranked content recommendation scopes include exploration scopes, sub-scopes, current scope), in block 403. A current scope marks the user's location in a category. Exemplary content recommendation scopes include, but are not limited to: a category and sub category (e.g., "Tech"); a publisher and source (e.g., "CNN"); a topic (e.g., "Miley"), an algorithm, an author, a brand, etc.

Content recommendation scopes may be selected according to one or more selection rules, such as for example: recommending categories based on previously visited categories (e.g., if user has previously visited these categories, whether explicitly, or implicitly by viewing documents, show these categories, selected by weight); recommending categories and super categories based on current scope (e.g., super category vs. category) and previously visited categories (e.g., identifying previously visited super categories from visited categories); recommending related categories (e.g., by using a static or dynamic relation matrix) to categories visited by user; recommending categories using multiple algorithms (e.g., exploration, based on user interests, related to content, related to user interests, collaborative filtering, clustering and other algorithms). In an implementation, one or more algorithms may be used to provide a confidence measure for itself, so the resulting content recommendation scopes can be weighted accordingly. Given more data about the user, the weight assigned to personal algorithms increases incrementally, with the weight assigned to contextual or exploration algorithms decreasing in proportion.

Additionally, an exploration algorithm (e.g., popular, trending, editor pinned content etc.) allows surfacing new content recommendation scopes for the user to explore. The user's implicit interactions with the surfaced exploration content recommendation scopes (e.g., 10 content recommendation scopes with different weights) generate accurate and valuable data on what the user really wants to read. The exploration content recommendation scopes can also be used to learn about the reading preferences of new readers, for whom there is insufficient historical data.

In an implementation, a content recommendation scope may be generated based on one or more of the following inputs: a document currently being viewed by the user (for which to show content recommendations); a source of the document; a UUID (from the user tracking cookie or user content profile); one or more current scopes; a number of scopes from each type to recommend; user interests data (taken from the user tracking cookie, e.g., visited categories and sources). Based on one or more of these inputs, a list of suggested content recommendation scopes is generated.

In one embodiment, as illustrated in FIG. 4, the method for serving content recommendation scopes may include one or more of the following operations: making a list of scopes with counts/weights (<EScope,String>=>Integer/Float); filling counts from the user tracking cookie; removing scopes deleted by the user.

In an implementation, in block 403, the method may further include adding a current scope to counts according to one or more of the following rules: if the current scope is a category, adding the category with a predefined weight (e.g., 15), and also adding it's super category with predefined weight (e.g., 10); if the current scope is a super category, adding it's categories with predefined weights (e.g., 3), in block 405.

In an implementation, in block 407, one or more exploration or experimental scopes may be added (e.g., 3N exploration scopes) for exploration each with total predefined weight (e.g., 1). In an implementation, in block 409, user content consumption data from the user taste profile graph is used to reweight the list of scopes in proportion to the percentage of the user's consumption of different content types as recorded in the user taste profile graph. In an implementation, the system may pick a number of scopes (e.g., N scopes), which can be categories, super categories, etc., by a weighted lottery, in block 411. In block 413, the weighted content recommendation scopes may be used to filter the graded content recommendations.

FIG. 5 illustrates a content recommendation widget associated with a content article on a publisher website. In an embodiment, the interface shown in FIG. 5 is generated by the content recommendation personalization module of the present disclosure. As shown in FIG. 5, multiple content recommendations and corresponding links are presented to a user. In an example, the user may interact with a selected content recommendation by clicking on a title associated with the content recommendation. In an embodiment, in response, the system of the present disclosure may render a corresponding webpage via a browser of the user's electronic device.

Figure 6:
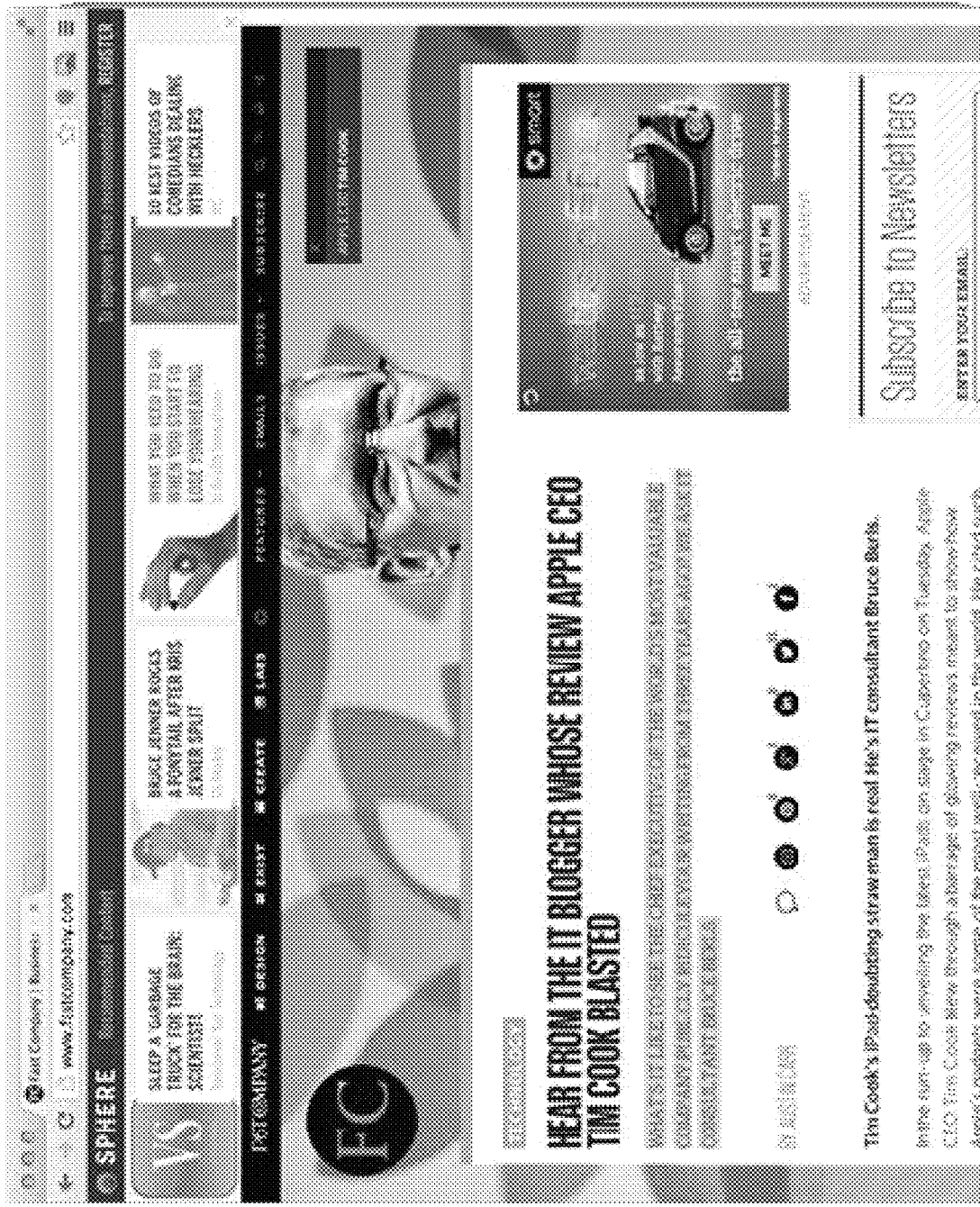
FIG. 6 is an exemplary screenshot of a content recommendation webpage frame, in accordance with various implementations.
Figure 7:
FIG. 7 is an exemplary screenshot of a content recommendation personalization hub front page, in accordance with various implementations.

FIG. 6 is an exemplary screenshot of a content recommendation webpage frame, according to implementations of the present disclosure. FIG. 7 is an exemplary screenshot of a content recommendation personalization hub front page.

Figure 8:
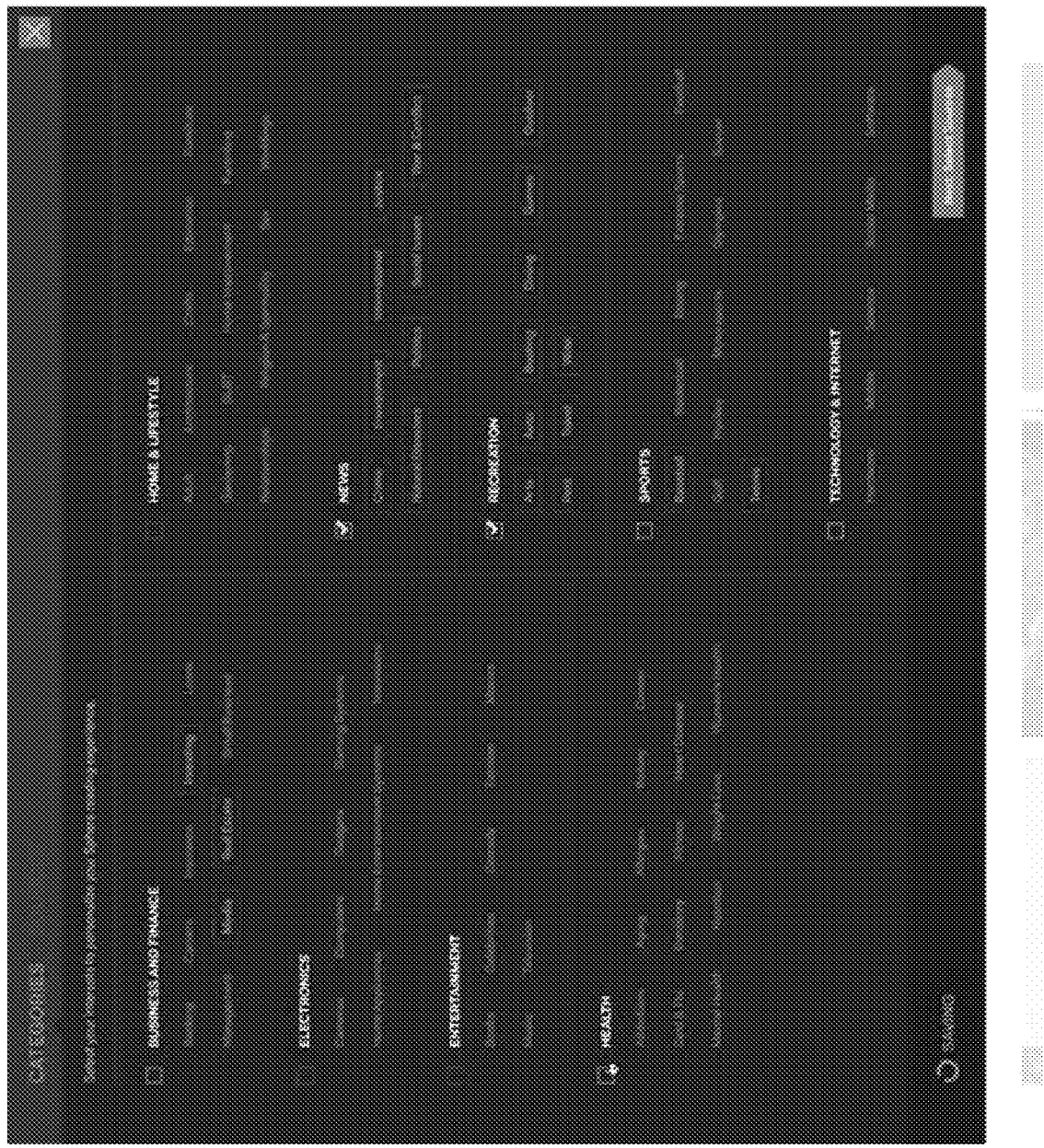
FIG. 8 is an exemplary screenshot of a content recommendation scope (e.g., a category), in accordance with various implementations.
Figure 9:
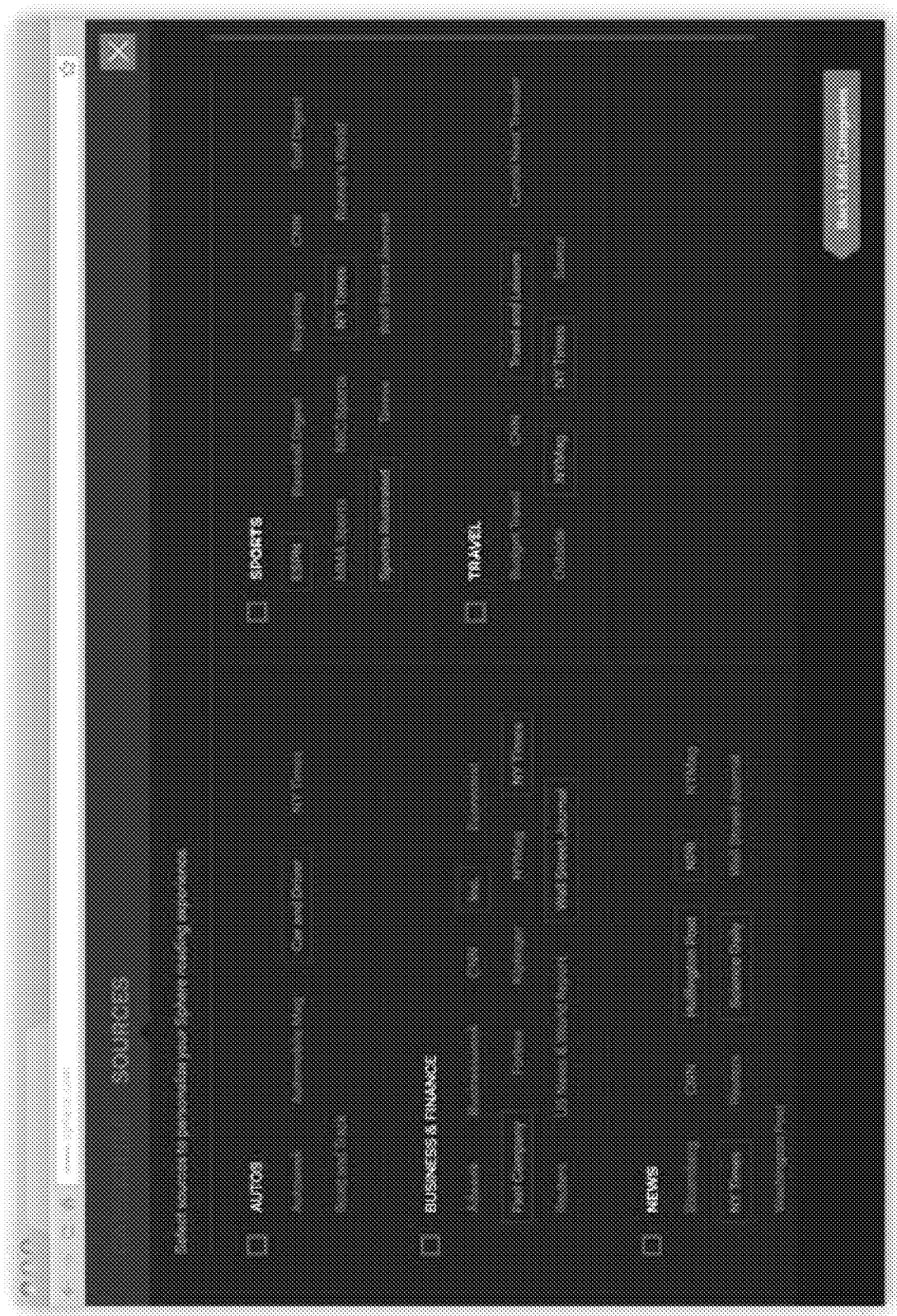
FIG. 9 is an exemplary screenshot of a content recommendation scope (e.g., a document source), in accordance with various implementations.
Figure 10:
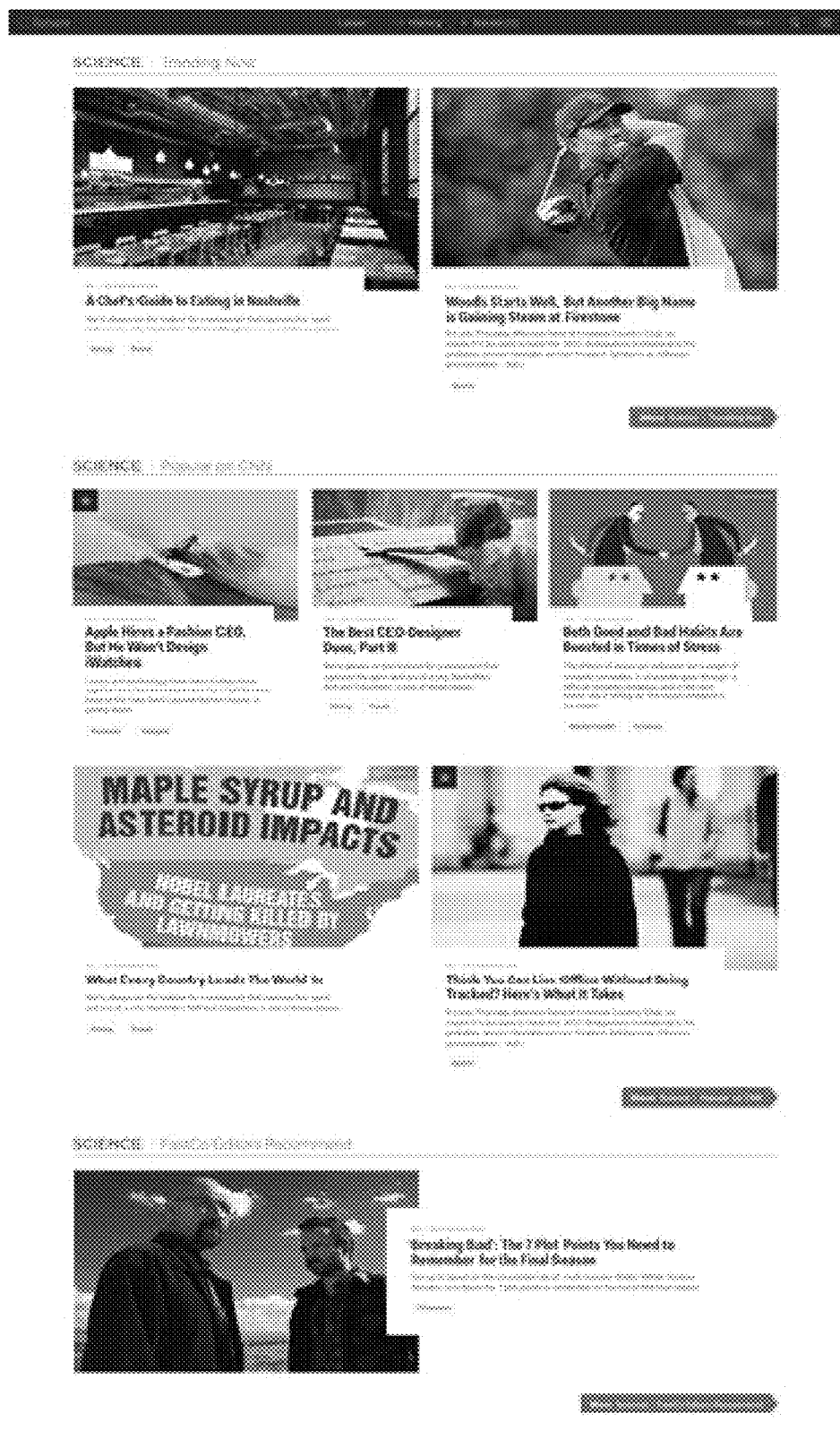
FIG. 10 is an exemplary screenshot of a scoped content recommendation display stream, in accordance with various implementations.
Figure 11:
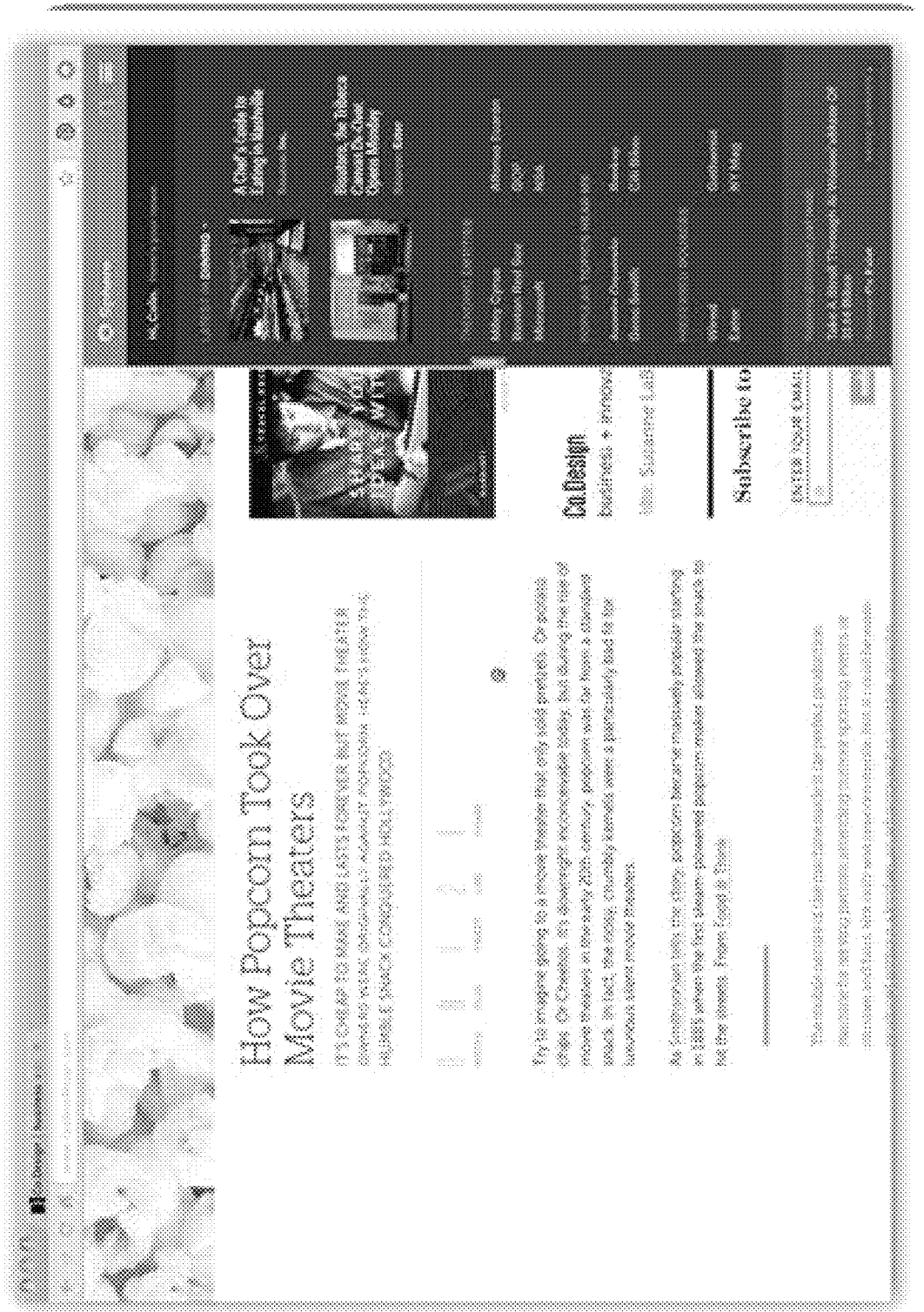
FIG. 11 is an exemplary screenshot of a content recommendation extension or add-on for a web browser, in accordance with various implementations.

FIG. 8 is an exemplary screenshot of a content recommendation scope (e.g., a category such as "Business and Finance," "Electronics," "Entertainment," etc.). FIG. 9 is an exemplary screenshot of a content recommendation scope based on a document source. FIG. 10 is an exemplary screenshot of a scoped content recommendation display stream. FIG. 11 is an exemplary screenshot of a content recommendation extension or add-on for a web browser.

Figure 12:
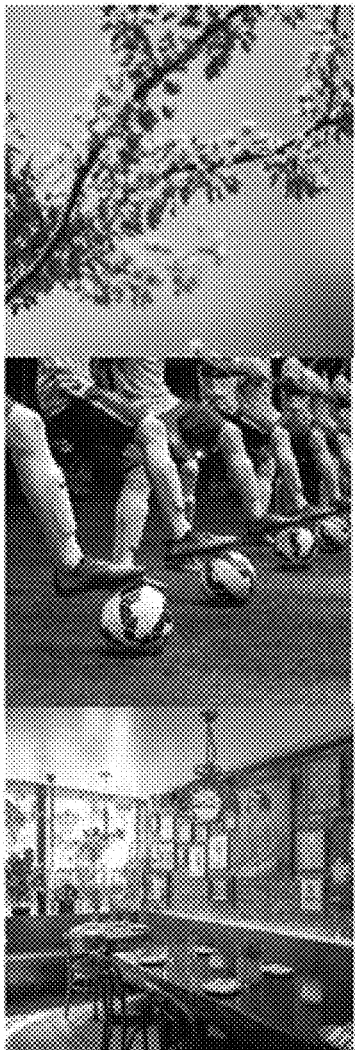
FIG. 12 is an exemplary screenshot of a content recommendation widget (post-registration), in accordance with various implementations.

FIG. 12 is an exemplary interface associated with a content recommendation widget, according to embodiments of the present disclosure. FIG. 12 shows an example interface generated by the content recommendation widget presenting a user with the option of clicking on any of the provisioning content recommendations.

According to implementations of the present disclosure, a framed webpage article provides another option for browsing the personalized content recommendations. Webpage frames can have several locations on a web page (e.g., a header, footer or right rail). A webpage frame provides the user with several options for navigation and clicking. The user can navigate through any of the actual links within the article template or engage directly with the frame. The functionality within the frame can mirror the content recommendation widget, with the user having the option of clicking on recommended content (e.g., the frame can be persistent from document to document), sorting or refreshing the recommendations based on a user input (e.g., show new recommendations in the "Technology" category, etc.). Users can register for the content recommendation network directly in the frame or navigate to the personalization hub homepage (e.g., by clicking the content recommendation network logo on the frame). Users can also access their personalized content recommendations by browsing the personalization hub homepage, which has a specific URL (e.g., https://www.sphere.com). On the personalization hub homepage the user has several options to engage with content—e.g., clicking directly on recommended content or one of the navigation branches (e.g., topics, entities, sources) will send them into a "sub-branch" (e.g., sphere-.com/science) with content recommendations specific to that given topic. In an implementation, a user can download a content recommendation extension or add-on to their web browser to invoke the content discovery experience at will throughout their web surfing.

Figure 14:
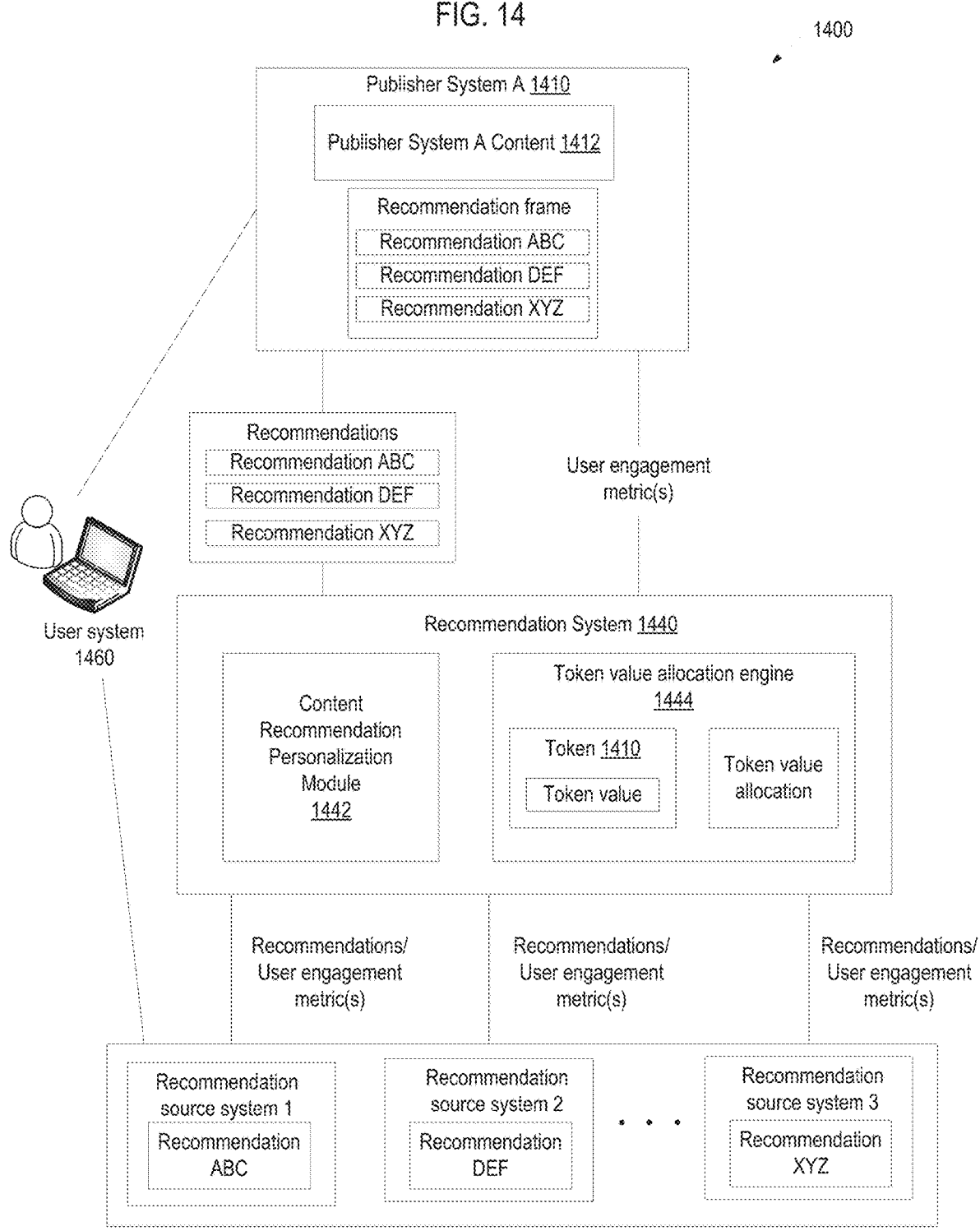
FIG. 14 is a block diagram illustrating an example content recommendation system including a token value allocation engine, in accordance with various implementations.

FIG. 14 is a block diagram of an example computing environment 1400 including a recommendation system 1440 communicatively coupled to multiple publisher systems (e.g., publisher system A 1410 of FIG. 14) and multiple recommendation source systems (e.g., recommendation source system 1, recommendation source system 2, and recommendation source system 3 of FIG. 14). In one embodiment, the recommendation system 1440 includes a content recommendation personalization module 1442 and a token value allocation engine 1444 configured to perform functions relating to the allocation of a token value relating to user engagement metrics (e.g., interactions by a user system 1460 with one or more web pages served by the publisher system A 1410), as described in greater detail below.

Conventionally, recommendation systems have employed a revenue allocation system based fundamentally on a direct correlation between RPMs (Revenue Per Mille e.g., revenue per 1000 page views) and profitability. In such instances, the selecting and sorting of content recommendations is based on RPM rates in an attempt to optimize for maximum revenue. For example, the RPM used conventionally may be based on a cost per click (CPC) plus a clickthrough rate. However, the clickthrough rate is based on the headline (e.g., the link to further content), and does not measure engagement with respect to the quality of the content "behind" the headline. In this example, the clickthrough is registered once the headline is clicked and utilizes computing resources to track and store information identifying the clickthrough activity. This conventional model, however, ignores a principle that users (e.g., readers of a publisher) do not care about RPM and focuses computing resources solely on tracking clickthrough activity, which results in an inefficient computing model.

In one or more embodiments of the present application, the recommendation system 1440 includes the token value allocation engine 1444 configured to optimize the allocation of content consumption revenue to publisher systems and recommendation source systems (e.g., the systems that provide the recommended content for presentation together with the publisher system's native content) based on a model calculating and applying a life time or long term value (LTV) metric.

In one embodiment, the LTV metric for revenue is based on a detection of a product of RPMs and a number of repeat RPMs associated with recommendation content served via a publisher system, where the number of repeat RPMs indicate continued user engagement over time. In one embodiment, the number of RPMs represents a level of user engagement (e.g., how often a user system engages with content derived from or associated with a publisher system). In one embodiment, the recommendation system 1440 establishes and manages a token for use with the serving of content recommendations on a publisher system. In one embodiment, a set price (also referred to as the "token value" is established for the token, such that the set price is allocated based on the use or exchange of the token. In one example, user engagement with a content recommendation results in the capturing of the token occurrence and results in the allocation of the token value.

In one embodiment, the content recommendation personalization module 1442 is configured to select one or more recommendations (e.g., recommendation ABC, recommendation DEF, and recommendation XYZ of FIG. 14) and cause a display of the selected recommendations via the publisher system A 1410 in connection with the publisher system A content 1412, as shown in FIG. 14. In one embodiment, the recommendation source systems (e.g., recommendation source systems 1-3 of FIG. 14) and publisher system A 1410 may be members of a closed network of publishers. In one embodiment, the network of publishers may be composed of multiple publishers that are registered with the recommendation system 1440 and have agreed to share recommended content with one another via their respective publisher systems and corresponding web pages. In one embodiment, the network of registered publisher systems participate in the establishment of the token value associated with the token used to track the exchange of recommendations across the various publisher system web pages. In one embodiment, publishers outside the network can still participate in it by paying for their content recommendations to be selected via a price bidding process for display across the various network publisher system web pages.

In one embodiment, the activity before an initial click (e.g., an initial user engagement metric) is managed and monitored. For example, the provisioning of recommendation content optimized for the user system (e.g., as described in detail above) to provide content that has a high probability of being interesting to a user of the content system. In one embodiment, the token value allocation engine 1444 tracks and analyzes the one or more user engagement metrics associated with the one or more web pages provisioned following the connection of the user system to the recommended content associated with the recommendation link (e.g., recommendation ABC, recommendation DEF, and recommendation XYZ). In one embodiment, the user's content interaction metrics (e.g., scrolling action, scrolling time, scrolling depth, clicks, likes, audio or video engagement, audio or video engagement time, etc.) following an initial interaction with the recommendation link or headline are also referred to as "subsequent user interaction metrics". In one embodiment, for the purposes of the token value allocation, the monitoring and managing of the "pre-click" activity and the "post-click" activity avoids or ignores the clickthrough activity itself, thereby resulting in processing and storing efficiencies.

In one embodiment, the token value allocation engine 1444 collects user engagement metrics associated with the publisher system A. Advantageously, focusing the token value allocation model on parameters and activity other than the clickthrough activity provides for an improved user experience and the provisioning of "better" recommendations (e.g., recommendations more likely to be of interest to the user).

According to embodiments, the content recommendation personalization module 1442 determines the one or more recommendations (e.g., recommendation ABC, recommendation DEF, recommendation XYZ) to be provided in a recommendation frame of a web page associated with the publisher system A 1410. In one embodiment, the recommendation source systems (e.g., recommendation source systems 1-3) and the publisher system A 1410 are associated with respective content publishers that are part of a closed network of registered publishers that agreed upon a value of the token used during the provisioning of content recommendations on the various systems. In one embodiment, an example process for generating a token value allocation is described in greater detail with respect to FIG. 15.

Figure 15:
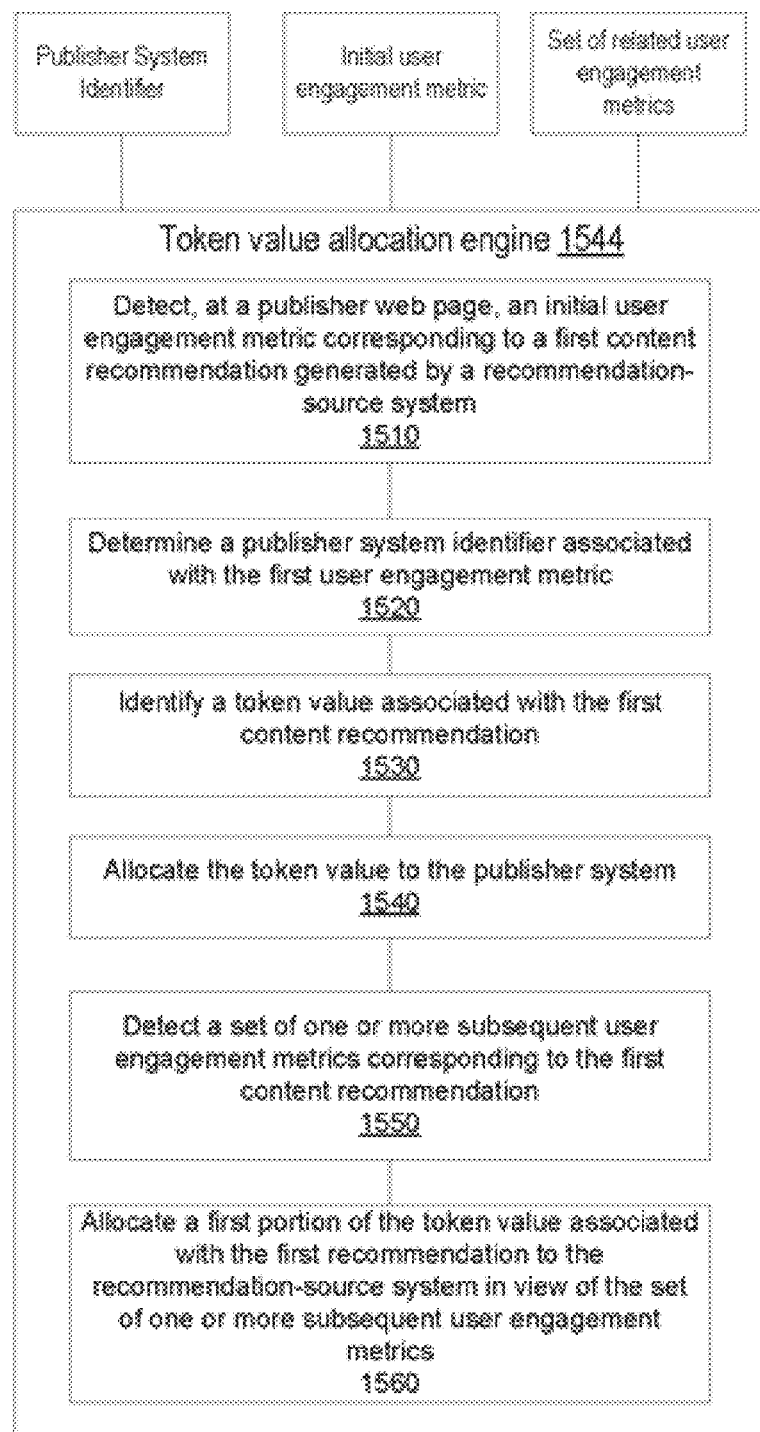
FIG. 15 is flow diagram of an implementation of a method for allocating token values associated with user engagement metrics relating to the serving of content recommendations, in accordance with various implementations.

FIG. 15 is a diagram illustrating an example process executed by the token value allocation engine 1544 (e.g., token value allocation engine 1444 of FIG. 14). In one embodiment, the method shown in FIG. 15 relates to the provisioning and monitoring of a content recommendation associated with a recommendation source system to a publisher source system. In one embodiment, a link or other access path to the content recommendation is generated and displayed in connection with native publisher content provisioned via a web page of the publisher system.

In block 1510, the token value allocation engine 1544 detects, at a publisher web page, an initial user engagement metric corresponding to a first recommendation generated by a recommendation source system. In one embodiment, the initial user engagement metric represents a user system interaction with the first recommendation (e.g., a link including a headline associated with the first recommendation). Examples of the initial user engagement metric may include a click on a link associated with the first recommendation, initiating the playing of a video or audio clip, etc. In one embodiment, information associated with the "initial" user engagement metric is captured and stored to enable the linking between that user engagement metric and subsequent user engagement metrics associated therewith, as described in greater detail below. In one example, a first user engagement with content identified as "recommended content" in a user session is identified and labeled as the "initial user engagement metric."

In block 1520, the token value allocation engine 1544 determines a publisher system identifier associated with the initial user engagement metric. In one embodiment, each publisher system in a network of publisher systems managed by the token value allocation engine 1544 is associated with a unique identifier that is electronically detected in connection with the occurrence and detection of a user engagement metric by a user system. In one embodiment, the publisher system identifier may be used by the token value allocation engine to identify the publisher system that served as a the "source" of the user activity relating to the content recommendation for purposes of allocating token values, as described in greater detail below.

In block 1530, the token value allocation engine 1544 identifies a token value associated with the first content recommendation. In one embodiment, the token value allocation engine 1544 maintains a data store including information identifying various content recommendations, publisher systems, and publisher system identifiers. In one embodiment, the token value allocation engine 1544 performs a look up or search using the data store to identify a token and token value corresponding to one or more of the first content recommendation, the publisher system identifier, or the recommendation-source system. It is noted that, like the publisher system, each of the recommendation-source systems is associated with a unique identifier. In one embodiment, a token (e.g. a tag) is associated with the first content recommendation. In response to the identification of the user engagement metric, the token is identified and stored in connection with the publisher source system identifier and the initial user engagement metric.

In block 1530, a token value associated with the first content recommendation is identified. In one embodiment, a token is captured in connection with the initial user engagement metric corresponding to the first content recommendation. The captured token may include or otherwise be associated with a token value. In another embodiment, a data store accessible by the token value allocation engine 1544 may store a token value in association with each of the one or more content recommendations, tokens, publisher systems, or recommendation source systems.

In one embodiment, a network of publisher systems (e.g., multiple publisher source systems and recommendation source systems) register with the token value allocation engine 1544. The registered publisher systems and recommendation source systems are each assigned a unique identifier and granted permission to provision content recommendations via the web pages of the other publisher systems in the network. For example, the network may include 100 publisher systems configured to present their native web pages and content along with one or more recommendation frames or slots for the provisioning of content recommendations from other publisher systems in the network.

In one embodiment, the network of publisher systems may set a fixed or universal token value associated with each token exchanged within the network. For example, in this embodiment, no CPC bidding for the various recommendation opportunities is performed, but instead a fixed CPC value (e.g., $0.15) is associated with each token exchange. In one embodiment, the token value is allocated by the token value allocation engine 1544 in response to each token exchange (e.g., an event generating a user engagement metric relating to a content recommendation) within the network. In one embodiment, multiple different networks of publisher systems may be formulated and managed by the token value allocation engine 1544, wherein each of the respective networks independently sets a fixed token value for the network.

In block 1540, in response to the first user engagement metric, the token value is allocated to the publisher system. In one embodiment, the full value of the token value is allocated to the publisher system (e.g., the source of the initial user engagement metric with the first content recommendation). In one embodiment, in contrast to conventional approaches, allocation of the full token value to the publisher system (e.g., the source) ignores the traditional allocation of one or more portions of revenue to the recommendation source system and/or the content recommendation system (e.g., recommendation system 1440 of FIG. 14). In one embodiment, the computing resources associated with managing and tracking a bidding process to identify revenue metrics are preserved in view of the use of the fixed token value.

In block 1550, the token value allocation engine 1544 detects a set of one or more subsequent user engagement metrics corresponding to the first content recommendation. In one embodiment, contextual information (e.g., session information, a user system identifier, an identifier associated with the initial user engagement metric, tags, data points, tokens etc.) is used to associate the set of related user engagement metrics with the initial user engagement metric.

In block 1560, the token value allocation engine 1544 allocates a first portion of the token value in view of the set of one or more subsequent user engagement metrics. In one embodiment, a percentage (e.g., 50%, 60%, 70%, 80%, 100% etc.) is allocated to the recommendation-source system for each of the one or more subsequent user engagement metrics (e.g., clicks, video playback, audio playback, scrolling time, scrolling depth, etc.). In one embodiment, no portion of the token value associated with the set of subsequent user engagement metrics is allocated to the publisher system receiving the full token value allocation in block 1540. In one embodiment, the full token value associated with each of the subsequent user engagement metrics is allocated to one or more of the recommendation-source system and the recommendation system managing the token value allocation engine 1544. Advantageously, the allocation plan executed in accordance with one or more embodiments of the present disclosure enable allocating a uniform token value for actual user engagement with recommended content, which represents "high" user engagement with the initial recommended content itself (e.g., engagement beyond a mere click of a headline or link associated with recommended content).

Figure 16:
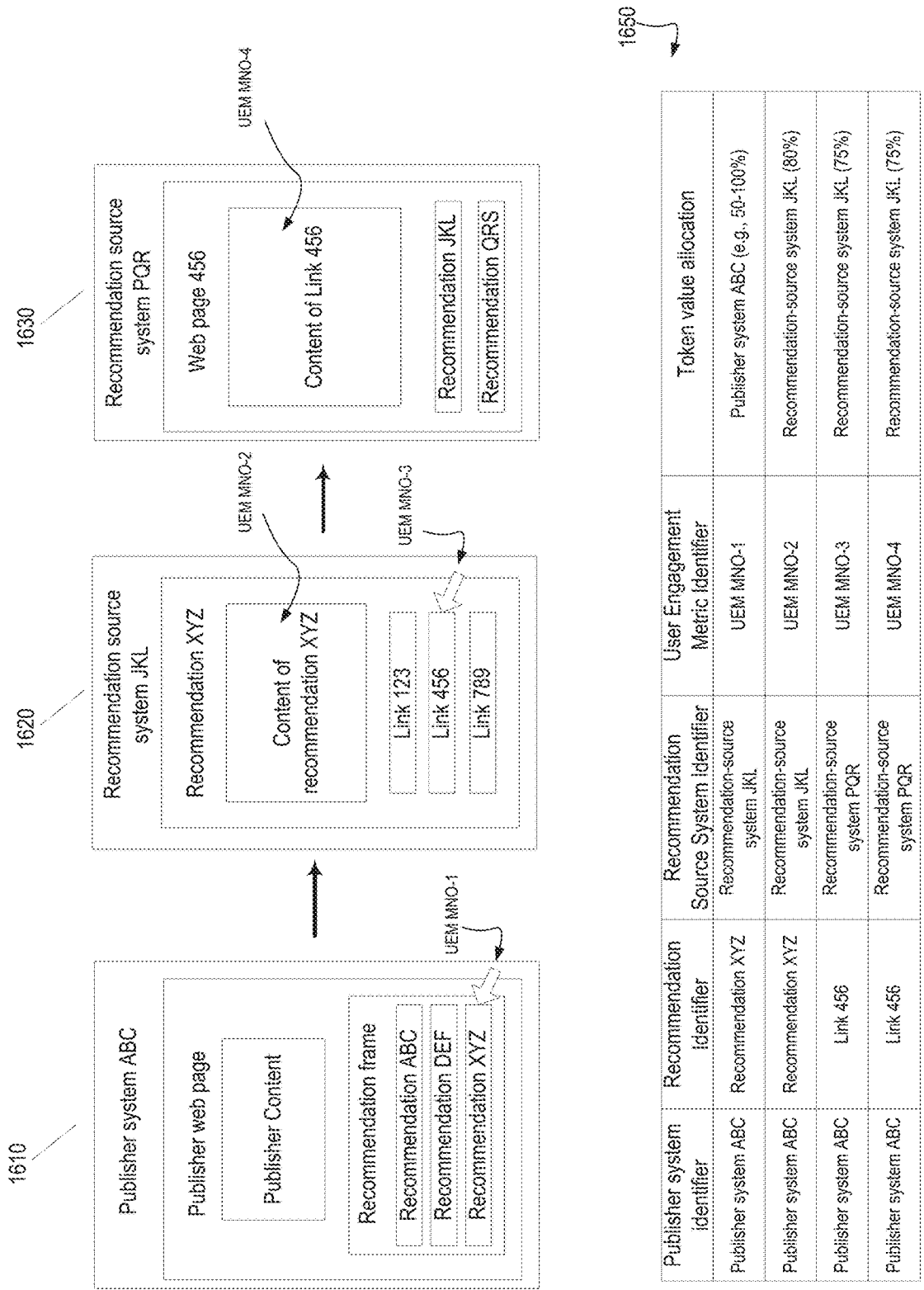
FIG. 16 is an exemplary flow diagram illustrating a generation of a token value allocation corresponding to a web page generation sequence, in accordance with various implementations.

FIG. 16 is a block diagram depicting an example sequence involving a including a publisher system ABC 1610 and a recommendation source system JKL 1620. FIG. 16 also depicts an example table 1650 of information generated and stored by token value allocation engine according to embodiments of the present disclosure. In one embodiment, the publisher system 1610 generates a publisher web page for display to a user system (not shown). The publisher web page includes native publisher content and a recommendation frame including multiple recommendations (e.g., recommendation ABC, recommendation DEF, and recommendation XYZ). In one embodiment, one or more recommendation-source systems provide the one or more recommendations for rendering in connection with the publisher content on the publisher web page. In one embodiment, the multiple recommendation-source systems and the publisher system ABC 1610 are registered as a network of content providers that establish a fixed token value for allocation in connection with actions generating user engagement metrics.

As shown in FIG. 16, an initial user engagement metric UEM MNO-1 is identified and associated information is captured. In this example, user engagement metric MNO-1 is the clicking, by a user system, on a link associated with recommendation XYZ. In response to user engagement metric MNO-1, the token value allocation engine generates entries or data points for inclusion in the monitoring table 1650 including fields identifying a publisher system identifier, a recommendation identifier, a recommendation-source system identifier, a user engagement metric identifier, and a token value allocation. In this example, in response to UEM MNO-1, "publisher system ABC" is detected for the publisher system identifier, "recommendation XYZ" is detected for the recommendation identifier, "recommendation-source system JKL" is detected for the recommendation-source system identifier, and "UEM MNO-1" is detected for the user engagement metric identifier.

In one embodiment, since UEM MNO-1 is the initial user engagement metric, the full value of the token (100%) is allocated to the publisher system ABC. As indicated by the arrow, the user system navigates to the recommendation-source system JKL by clicking on the link associated with the recommendation XYZ. The underlying content of recommendation XYZ is presented by the recommendation-source system JKL. In addition, recommendation source system JKL may include a recommendation frame presenting additional content recommendation links (e.g., Link 123, Link 456, and Link 789).

As shown in FIG. 16, a subsequent user engagement metric is identified (UEM MNO-2). In this example, UEM MNO-2 is captured when the user system exceeds a threshold session scrolling time in session scrolling activity associated with the content of recommendation XYZ. In response to the detection of UEM MNO-2, a second row of table 1650 is generated. As shown, a token value allocation of 80% to recommendation-source system JKL is executed. In one embodiment, the remaining 20% of the token value may be allocated to the recommendation system, the publisher system, or distributed among the two systems.

Next, the user system clicks on Link 456 of the web page associated with recommendation XYZ, resulting the generation and identification of UEM MNO-3. In response to UEM MNO-3, the token value allocation engine generates a corresponding row of information in the record (e.g., the third row of table 1650). In addition, the token value allocation engine allocates 75% of the token value to recommendation-source system JKL. As described above, in one embodiment, the remaining 25% of the token value may be allocated to the recommendation system, the publisher system, or distributed among the two systems.

Continuing the example shown in FIG. 16, upon selection of link 456, the user system is presented with web page 456 generated by recommendation-source system PQR 1630. Upon detection of an interaction by the user system with the content of link 456 (UEM MNO-4), an additional row is added to the record shown in table 1650. As shown, the token value allocation engine allocates 75% of the token value to recommendation-source system JKL. Since the set of subsequent user engagement metrics (e.g., UEM MNO-2, 3, and 4) are associated with the initial user engagement metric (e.g., UEM MNO-1), a portion of the allocation of the token value is associated with recommendation-source system identified in connection with the initial user engagement metric (e.g., UEM MNO-1).

In one embodiment, the allocation of the entire token value is assigned to the publisher system serving the recommended content (or link associated therewith) that is the subject of the initial user engagement metric. In one embodiment, the token values of the one or more token exchanges corresponding to the set of one or more subsequent user engagement may be allocated in whole or in part to a recommendation-source system associated with the content or link initially engaged with via the publisher system. In one embodiment, any portion of the token value (including the whole) may be allocated to the recommendation-source system and the recommendation system (e.g., an intermediary system generating the content recommendations for the publisher system) for each of the subsequent user engagement metrics.

Figure 17:
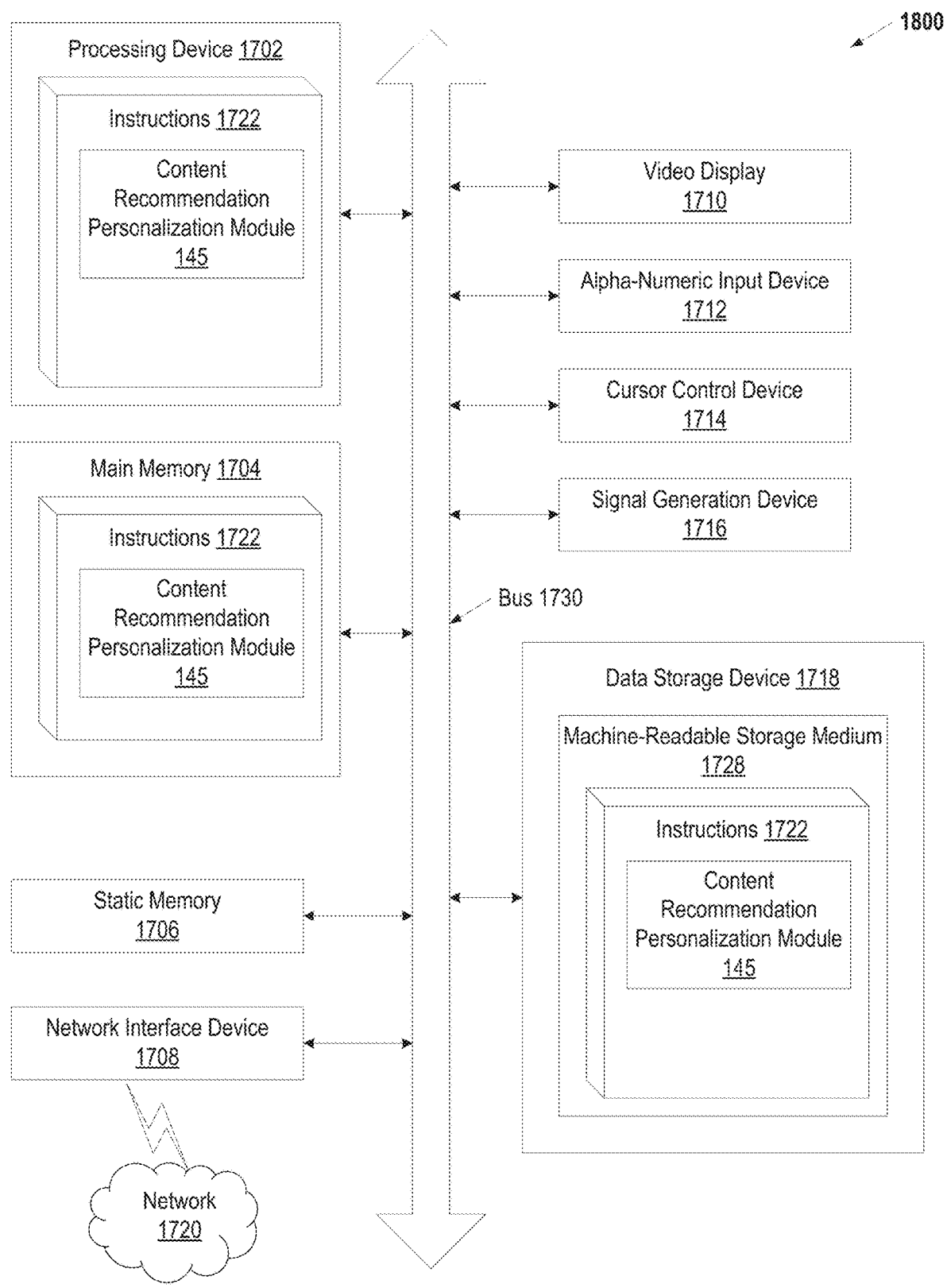
FIG. 17 is a block diagram of an example computer system that may perform one or more of the operations described herein, in accordance with various implementations.

FIG. 17 is a block diagram of an example computer system 1700 that may perform one or more of the operations described herein, in accordance with various implementations. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processing device (e.g., a processor) 1702, a main memory 1704 (e.g., read-only memory (ROM), flash memory, dynamic random access memory (DRAM) such as synchronous DRAM (SDRAM), double data rate (DDR SDRAM), or DRAM (RDRAM), etc.), a static memory 1706 (e.g., flash memory, static random access memory (SRAM), etc.), and a data storage device 1714, which communicate with each other via a bus 1730.

Processor 1702 represents one or more general-purpose processing devices such as a microprocessor, central processing unit, or the like. More particularly, the processor 1702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1702 may also be one or more special-purpose processing devices such as an application specific integrated circuit (ASIC), a field programmable gate array (FPGA), a digital signal processor (DSP), network processor, or the like. The processor 1702 is configured to execute instructions 1722 for performing the operations and steps discussed herein.

The computer system 1700 may further include a network interface device 1704. The computer system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), and a signal generation device 1716 (e.g., a speaker).

The data storage device 1714 may include a computer-readable storage medium 1724 on which is stored one or more sets of instructions 1722 (e.g., software) embodying any one or more of the methodologies or functions described herein. The instructions 1722 may also reside, completely or at least partially, within the main memory 1704 and/or within the processor 1702 during execution thereof by the computer system 1700, the main memory 1704 and the processor 1702 also constituting computer-readable storage media. The instructions 1722 may further be transmitted or received over a network 1720 via the network interface device 1708.

In one implementation, the instructions 1722 include instructions for an optimization module (e.g., content recommendation personalization module 145 in FIG. 1) and/or a software library containing methods that call the optimization module. While the computer-readable storage medium 1728 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "establishing", "generating", "identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    establishing, by a processing device, a plurality of high-quality candidate content recommendation pools, wherein each of the plurality of high-quality candidate content recommendation pools comprises a plurality of candidate content recommendations;
    generating a general grade associated with each of the plurality of candidate content recommendations in a first high-quality candidate content recommendation pool;
    generating a user profile associated with a first user associated with a user system, wherein the user profile comprises registration information collected by an online registration of the first user;
    generating a personalized grade associated with each of the plurality of candidate recommendations in the first high-quality candidate content recommendation pool, wherein the personalized grade is generated in view of registration information associated with the first user;
    determining a recommendation scope associated with the first user in view of the personalized grade associated with each of the plurality of candidate content recommendations, wherein the content recommendation scope comprise one or more scoped content recommendations;
    displaying, via a web page of a publisher system, the content recommendation scope to the user system;
    detecting an initial user engagement metric corresponding to a first content recommendation of the content recommendation scope, wherein the first content recommendation is generated by a recommendation-source system; and
    allocating a token value associated with the first content recommendation to the publisher system.

2. The method of claim 1, wherein each of the plurality of high-quality candidate content recommendation pools is associated with a user trust measurement.

3. The method of claim 2, further comprising determining the user interest measurement in view of a user trust signal.

4. The method of claim 1, further comprising:
    registering the first user by collecting registration information associated with the first user; and
    generating a user profile associated with the first user, wherein the user profile comprises the registration information and user activity.

5. The method of claim 4, wherein the user activity comprises information identifying content consumed by the first user collected by an associated tracking cookie.

6. The method of claim 1, further comprising detecting a subsequent user engagement metric associated with the first user engagement metric.

7. The method of claim 6, further comprising allocating a portion of the token value associated with the first content recommendation to the recommendation-source system.

8. The method of claim 1, wherein the general grade associated with a first candidate content recommendation of the plurality of a candidate content recommendations is determined in view of an online click through rate (CTR) derived from aggregated user data associated with the first candidate content recommendation.

9. The method of claim 1, wherein a set of candidate content recommendations of the content recommendation scope are filtered in view of a respective personalized grade associated with each of the candidate content recommendations of the content recommendation scope.

10. The method of claim 1, further comprising establishing a first network comprising the publisher system, the recommendation-source system, and one or more additional recommendation-source systems.

11. A system comprising:
    a memory comprising instructions; and
    a processing device operatively coupled to the memory, the processing device to execute the instructions to:
        establish a plurality of candidate content recommendation pools, wherein each of the plurality of candidate content recommendation pools comprises a plurality of candidate content recommendations;
        generate a general grade associated with each of the plurality of candidate content recommendations in a first candidate content recommendation pool;
        generate a user profile associated with a first user associated with a user system, wherein the user profile comprises registration information collected by an online registration of the first user;

generate a personalized grade associated with each of the plurality of candidate recommendations in the first candidate content recommendation pool, wherein the personalized grade is generated in view of registration information associated with the first user;

generate, for display via a publisher web page generated by a first publisher system, a first link to a first candidate content recommendation of the first candidate content recommendation pool;

detect, at the publisher web page, an initial user engagement metric corresponding to the first link by a user system; and allocate, to the first publisher system, a full amount of a token value to the publisher system in response to detection of the initial user engagement.

12. The system of claim 11, the processing device to execute the instructions to:

associate the token value with a network of a plurality of publisher systems comprising the first publisher system and the recommendation-source system, wherein the token value is an agreed upon amount of revenue associated with each user engagement metric.

13. The system of claim 12, wherein the plurality of publisher systems register as members of the network and establish a monetary value to set as the token value.

14. The system of claim 11, the processing device to execute the instructions to:

detect a set of one or more subsequent user engagement metrics corresponding to the first content recommendation; and allocate a first portion of the token value associated with the first recommendation to the recommendation-source system in response to detection of each of the set of one or more subsequent user engagement metrics.

15. The system of claim 11, the processing device to execute the instructions to:

determine a publisher system identifier corresponding to the first publisher system in response to detection of the first user engagement metric.

16. A non-transitory computer-readable storage medium comprising executable instructions that, when executed by a processing device, cause the processing device to:

establish a plurality of candidate content recommendation pools, wherein each of the plurality of candidate content recommendation pools comprises a plurality of candidate content recommendations;

generate a general grade associated with each of the plurality of candidate content recommendations in a first candidate content recommendation pool;

generate a user profile associated with a first user associated with a user system, wherein the user profile comprises registration information collected by an online registration of the first user;

generate a personalized grade associated with each of the plurality of candidate recommendations in the first candidate content recommendation pool, wherein the personalized grade is generated in view of registration information associated with the first user;

generate, for display via a publisher web page generated by a first publisher system, a first link to a first candidate content recommendation of the first candidate content recommendation pool;

detect, at the publisher web page, an initial user engagement metric corresponding to the first link by a user system; and allocate, to the first publisher system, a full amount of a token value to the publisher system in response to detection of the initial user engagement.

17. The non-transitory computer-readable storage medium of claim 16, the processing device to:

detect a set of one or more subsequent user engagement metrics corresponding to the first content recommendation; and allocate a first portion of the token value associated with the first recommendation to the recommendation-source system in response to detection of each of the set of one or more subsequent user engagement metrics.

18. The non-transitory computer-readable storage medium of claim 16, the processing device to:

determine a publisher system identifier corresponding to the first publisher system in response to detection of the first user engagement metric.

19. The non-transitory computer-readable storage medium of claim 16, the processing device to execute the instructions to:

associate the token value with a network of a plurality of publisher systems comprising the first publisher system and the recommendation-source system, wherein the token value is an agreed upon amount of revenue associated with each user engagement metric.

* * * * *